(12) United States Patent
Naoi et al.

(10) Patent No.: US 11,170,812 B2
(45) Date of Patent: Nov. 9, 2021

(54) MAGNETIC RECORDING MEDIUM INCLUDING SPECIFIED COMPOUND, MAGNETIC RECORDING AND REPRODUCING APPARATUS, AND COMPOSITION FOR MAGNETIC RECORDING MEDIUM

(71) Applicant: FUJIFILM Corporation, Tokyo (JP)

(72) Inventors: Kenji Naoi, Minami-ashigara (JP); Masashi Shirata, Minami-ashigara (JP); Wataru Kikuchi, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 65 days.

(21) Appl. No.: 16/555,571

(22) Filed: Aug. 29, 2019

(65) Prior Publication Data

US 2020/0075052 A1 Mar. 5, 2020

(30) Foreign Application Priority Data

Aug. 31, 2018 (JP) .............................. JP2018-163454

(51) Int. Cl.
*G11B 5/706* (2006.01)
*G11B 5/714* (2006.01)
*G11B 5/70* (2006.01)
*G11B 5/702* (2006.01)

(52) U.S. Cl.
CPC ........ *G11B 5/70678* (2013.01); *G11B 5/7006* (2013.01); *G11B 5/7013* (2013.01); *G11B 5/7023* (2013.01); *G11B 5/7028* (2013.01); *G11B 5/714* (2013.01)

(58) Field of Classification Search
None
See application file for complete search history.

(56) References Cited

U.S. PATENT DOCUMENTS

| | | | |
|---|---|---|---|
| 5,652,320 A * | 7/1997 | Takemoto | .......... C08G 18/0819 528/71 |
| 9,704,525 B2 * | 7/2017 | Kasada | ................ G11B 5/7085 |
| 10,074,393 B2 * | 9/2018 | Kaneko | ...................... B22F 7/04 |
| 10,477,072 B2 * | 11/2019 | Kasada | ................ G11B 5/8404 |
| 10,497,389 B2 * | 12/2019 | Kaneko | .............. G11B 5/70678 |
| 10,510,369 B2 * | 12/2019 | Kaneko | ................... G11B 5/708 |
| 10,679,660 B2 * | 6/2020 | Kaneko | ..................... H01F 1/11 |
| 2011/0003241 A1 * | 1/2011 | Kaneko | ................... C09D 7/45 430/7 |
| 2012/0069083 A1 * | 3/2012 | Yasuda | ................. C09D 11/40 347/21 |
| 2012/0295135 A1 | 11/2012 | Omura | |
| 2014/0212693 A1 | 7/2014 | Hattori | |
| 2016/0276076 A1 | 9/2016 | Kasada | |
| 2017/0092316 A1 * | 3/2017 | Imamura | ................. G11B 5/842 |
| 2018/0061447 A1 | 3/2018 | Kasada | |
| 2019/0295585 A1 * | 9/2019 | Kikuchi | ................ G11B 5/7023 |
| 2019/0362753 A1 * | 11/2019 | Terakawa | ............... G11B 5/714 |
| 2020/0230561 A1 * | 7/2020 | Coulbeck | ............... C08G 69/44 |
| 2020/0312359 A1 * | 10/2020 | Naoi | .................. G11B 5/70642 |

FOREIGN PATENT DOCUMENTS

| | | |
|---|---|---|
| JP | 2012-241094 A | 12/2012 |
| JP | 2014-149886 A | 8/2014 |
| JP | 2016-177851 A | 10/2016 |
| JP | 2018-037127 A | 3/2018 |
| JP | 2019-169225 A | 10/2019 |

OTHER PUBLICATIONS

Office Action dated May 25, 2021, from the Japanese Patent Office in Japanese application No. 2018-163454.

* cited by examiner

*Primary Examiner* — Kevin M Bernatz

(74) *Attorney, Agent, or Firm* — Sughrue Mion, PLLC

(57) ABSTRACT

A magnetic recording medium, a composition for it, and a magnetic recording and reproducing apparatus are provided. The medium includes a non-magnetic support; and a magnetic layer including a ferromagnetic powder and a binding agent on the support. The magnetic layer also includes a compound including one or more partial structures selected from partial structures represented by Formulas 1 and 2, and a polyalkyleneimine chain. The composition for the recording medium includes a ferromagnetic powder and the compound. In Formulas 1 and 2, $L^1$ and $L^2$ each independently represents a divalent linking group, $Z^1$ and $Z^2$ each independently represents a monovalent group represented by —OM or a monovalent group represented by —O⁻A⁺, M represents a hydrogen atom or an alkali metal atom, and A⁺ represents an ammonium cation.

19 Claims, No Drawings

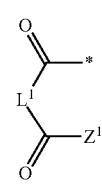

Formula 1

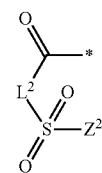

Formula 2

MAGNETIC RECORDING MEDIUM INCLUDING SPECIFIED COMPOUND, MAGNETIC RECORDING AND REPRODUCING APPARATUS, AND COMPOSITION FOR MAGNETIC RECORDING MEDIUM

CROSS-REFERENCE TO RELATED APPLICATIONS

This application claims priority under 35 U.S.C 119 to Japanese Patent Application No. 2018-163454 filed on Aug. 31, 2018. The above application is hereby expressly incorporated by reference, in its entirety, into the present application.

BACKGROUND OF THE INVENTION

1. Field of the Invention

The present invention relates to a magnetic recording medium, a magnetic recording and reproducing apparatus, and a composition for a magnetic recording medium.

2. Description of the Related Art

A coating-type magnetic recording medium (hereinafter, also simply referred to as a "magnetic recording medium") is manufactured by forming a magnetic layer by applying a composition including a ferromagnetic powder and a binding agent onto a non-magnetic support directly or through other layers such as a non-magnetic layer and the like.

In the related art, it has been proposed to use additives, in order to improve performance of a magnetic recording medium (for example, see paragraphs 0044 to 0049 of JP2012-241094A).

SUMMARY OF THE INVENTION

A magnetic recording medium is used in various environments. As one aspect of a usage environment of the magnetic recording medium, a high temperature and high humidity environment is used.

Meanwhile, the magnetic recording medium is desired to exhibit an excellent durability during the usage. Specific description is as follows. For example, in a sliding type magnetic recording and reproducing apparatus, in a case of recording information on a magnetic layer and reproducing information recorded on the magnetic layer, a magnetic head and a surface of the magnetic layer come into contact and slide on each other. However, in a magnetic recording medium having a low durability, scraps are generated due to chipping of a surface of a magnetic layer generated due to the sliding with the magnetic head, and these scraps may cause spacing loss which is called an output decrease. Therefore, an excellent durability is desired for the magnetic recording medium.

From the above description, as performance desired for the magnetic recording medium, a function of hardly generating scraps of the surface of the magnetic layer during the usage in a high temperature and high humidity environment (that is, exhibiting an excellent durability) is used. However, according to the studies of the inventors, it is thought that it is difficult to achieve sufficient improvement of performance regarding this point, in a case of using additives proposed in the related art.

One aspect of the invention provides for a magnetic recording medium capable of exhibiting an excellent durability in a high temperature and high humidity environment.

According to one aspect of the invention, there is provided a magnetic recording medium comprising: a non-magnetic support; and a magnetic layer including a ferromagnetic powder and a binding agent on the non-magnetic support, in which the magnetic layer further includes a compound including one or more partial structures selected from the group consisting of a partial structure represented by Formula 1 and a partial structure represented by Formula 2, and a polyalkyleneimine chain.

According to another aspect of the invention, there is provided a composition for a magnetic recording medium, comprising: a ferromagnetic powder; and a compound including one or more partial structures selected from the group consisting of a partial structure represented by Formula 1 and a partial structure represented by Formula 2, and a polyalkyleneimine chain.

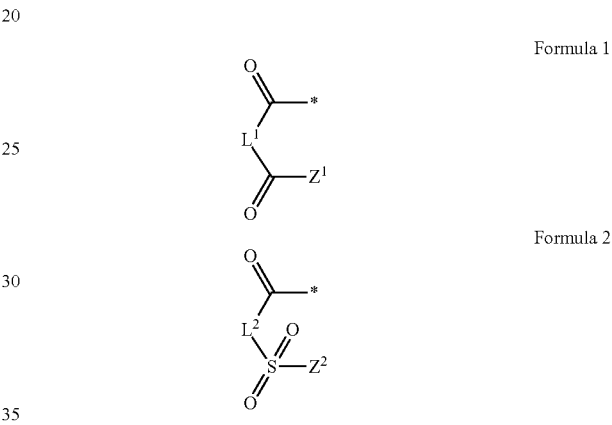

($L^1$ in Formula 1 and $L^2$ in Formula 2 each independently represent a divalent linking group, $Z^1$ in Formula 1 and $Z^2$ in Formula 2 each independently represent a monovalent group represented by —OM or a monovalent group represented by —$O^-A^+$, M represents a hydrogen atom or an alkali metal atom, and $A^+$ represents an ammonium cation.)

In one embodiment, the compound may include 1 to 10 partial structures in a molecule.

In one embodiment, a weight-average molecular weight of the compound may be 3,000 to 34,000.

In one embodiment, the ferromagnetic powder may be a hexagonal ferrite powder.

In one embodiment, the ferromagnetic powder may be an ε-iron oxide powder.

In one embodiment, an average particle size of the ferromagnetic powder may be 5 to 50 nm.

In one embodiment, the compound may include a vinyl polymer chain.

In one embodiment, the compound may include a polyester chain.

In one embodiment, the magnetic layer may include 0.5 to 50.0 parts by mass of the compound with respect to 100.0 parts by mass of the ferromagnetic powder.

In one embodiment, the composition for a magnetic recording medium may include 0.5 to 50.0 parts by mass of the compound with respect to 100.0 parts by mass of the ferromagnetic powder.

According to still another aspect of the invention, there is provided a magnetic recording and reproducing apparatus comprising: the magnetic recording medium; and a magnetic head.

According to one embodiment of the invention, it is possible to provide a magnetic recording medium capable of exhibiting an excellent durability in a high temperature and high humidity environment and a composition for a magnetic recording medium usable in the manufacturing of the magnetic recording medium. In addition, according to one embodiment of the invention, it is possible to provide a magnetic recording and reproducing apparatus including the magnetic recording medium.

DESCRIPTION OF THE PREFERRED EMBODIMENTS

Magnetic Recording Medium

One aspect of the invention relates to a magnetic recording medium including: a non-magnetic support; and a magnetic layer including a ferromagnetic powder and a binding agent on the non-magnetic support, in which the magnetic layer further includes a compound including one or more partial structures selected from the group consisting of a partial structure represented by Formula 1 and a partial structure represented by Formula 2, and a polyalkyleneimine chain.

The magnetic recording medium includes the compound including the partial structure and the polyalkyleneimine chain in the magnetic layer. The inventors have surmised that the compound including the partial structure and the polyalkyleneimine chain which is excellent for adsorption to the ferromagnetic powder and/or hardly inhibits affinity between the ferromagnetic powder and a binding agent, may be a reason for improvement of a durability of the magnetic recording medium in a high temperature and high humidity environment (hereinafter, also simply referred to as a "durability") due to the usage of the compound, specifically, a reason for an increase in coating hardness of the magnetic layer. However, this is merely a surmise, and the invention is not limited to such a surmise.

Hereinafter, the magnetic recording medium will be described in detail.

Compound Included in Magnetic Layer

The magnetic layer of the magnetic recording medium includes the compound including one or more partial structures selected from the group consisting of a partial structure represented by Formula 1 and a partial structure represented by Formula 2, and a polyalkyleneimine chain.

Polyalkyleneimine Chain

A "polyalkyleneimine chain" means a polymer including two or more alkyleneimine chains which are same as or different from each other. Specific examples of the alkyleneimine chain include an alkyleneimine chain represented by Formula 3 and an alkyleneimine chain represented by Formula 4.

Formula 3

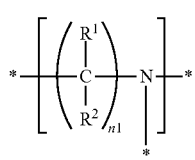

Formula 4

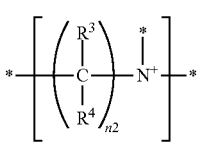

In Formula 3, $R^1$ and $R^2$ each independently represent a hydrogen atom or an alkyl group and n1 represents an integer equal to or greater than 2. In Formula 4, $R^3$ and $R^4$ each independently represent a hydrogen atom or an alkyl group and n2 represents an integer equal to or greater than 2.

In the invention and the specification, "*" in the formula representing a part of the compound represents a binding site of the partial structure and an adjacent atom. The bonding of one of two binding sites regarding nitrogen cation ($N^+$) in Formula 4 is normally ion bond of an anion and a nitrogen cation (formation of a salt crosslinking group). The binding at the other binding site represented by "*" is normally a covalent bond.

In the invention and the specification, the disclosed group may have a substituent or may not have a substituent, unless otherwise noted. In addition, the "number of carbons" regarding the group having a substituent means the number of carbons not including the number of carbons of the substituent, unless otherwise noted. In the invention and the specification, the examples of the substituent include an alkyl group (for example, an alkyl group having 1 to 6 carbon atoms), a hydroxy group, an alkoxy group (for example, an alkoxy group having 1 to 6 carbon atoms), an halogen atom (for example, a fluorine atom, a chlorine atom, a bromine atom, and the like), a cyano group, an amino group, a nitro group, an acyl group, a carboxy group, salt of a carboxy group, a sulfonic acid group, and salt of a sulfonic acid group.

$R^1$ and $R^2$ in the alkyleneimine chain represented by Formula 3 and $R^3$ and $R^4$ in the alkyleneimine chain represented by Formula 4 each independently represent a hydrogen atom or an alkyl group. The alkyl group can be an alkyl group having 1 to 6 carbon atoms, is preferably an alkyl group having 1 to 3 carbon atoms, more preferably a methyl group or an ethyl group, and even more preferably a methyl group. The alkyl group is preferably a non-substitutional alkyl group. Examples of a combination of $R^1$ and $R^2$ in Formula 3 include an aspect in which one is a hydrogen atom and the other one is an alkyl group, an aspect in which both are hydrogen atoms, an aspect in which both are alkyl groups (alkyl groups which are same or different from each other), and preferably an aspect in which both are hydrogen atoms. The same applies to $R^3$ and $R^4$ in Formula 4.

A structure having the smallest number of carbons configuring a ring as alkyleneimine is ethylene imine, and the number of carbons of a main chain of the alkyleneimine chain (ethylene imine chain) obtained by ring opening of ethylene imine. Accordingly, the lower limit of n1 in Formula 3 and n2 in Formula 4 is 2. That is, n1 in Formula 3 and n2 in Formula 4 each independently represent an integer equal to or greater than 2. From a viewpoint of further improving durability, n1 in Formula 3 and n2 in Formula 4 are each independently preferably equal to or smaller than 10, more preferably equal to or smaller than 6, even more preferably equal to or smaller than 4, still preferably 2 or 3, still more preferably 2.

Partial Structure Represented by Formula 1/Formula 2

The compound includes one or more partial structures selected from the group consisting of a partial structure represented by Formula 1 and a partial structure represented by Formula 2, together with the polyalkyleneimine chain. One aspect of the compound is a compound including one or more partial structures represented by Formula 1 alone as such partial structures in a molecule, another aspect is a compound including one or more partial structures represented by Formula 2 alone in a molecule, and still another aspect is a compound including one or more partial structures represented by Formula 1 and one or more partial structures represented by Formula 2 alone in a molecule. The number of the one or more partial structures selected from the group consisting of a partial structure represented by Formula 1 and a partial structure represented by Formula 2 is equal to or greater than 1, preferably 1 to 10, and more preferably 1 to 8 per molecule. In a case where two or more partial structures are included in a molecule, all of the structures of the included partial structures may be the same as each other or different from each other.

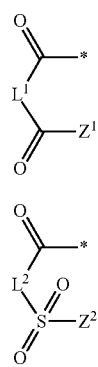

Formula 1

Formula 2

$L^1$ in Formula 1 and $L^2$ in Formula 2 each independently represent a divalent linking group. As the divalent linking group, a divalent linking group configured with one selected from or a combination of two or more groups selected from the group consisting of an alkylene group which may have a linear, branched, or a cyclic structure, an alkenylene group which may have a linear, branched, or a cyclic structure, an aromatic group, —C(=O)—, and —O—. The aromatic group may or may not include a hetero atom and it is preferable that the aromatic group does not include a hetero atom (that is, arylene group). Examples of preferable divalent linking group include an alkylene group having 1 to 10 carbon atoms, an alkenylene group having 2 to 10 carbon atoms, and an aromatic group having 6 to 12 carbon atoms. Examples of more preferable divalent linking group include an alkylene group having 1 to 10 carbon atoms and an aromatic group having 6 to 12 carbon atoms. Examples of even more preferable divalent linking group include a linear alkylene group having 1 to 5 carbon atoms, a cycloalkylene group having 6 to 10 carbon atoms, and an arylene group having 6 to 12 carbon atoms.

$Z^1$ in Formula 1 and $Z^2$ in Formula 2 each independently represent a monovalent group represented by —OM or a monovalent group represented by —O$^-$A$^+$.

In —OM, M represents a hydrogen atom or an alkali metal atom. The alkali metal atom is, for example, a sodium atom and a potassium atom. The monovalent group represented by —OM is preferably —OH (that is, hydroxy group), —ONa or —OK, and more preferably —OH or —ONa.

In —O$^-$A$^+$, A$^+$ represents an ammonium cation. In —O$^-$A$^+$, oxygen anion and the ammonium cation represented by A$^+$ are bonded by ion bond to form salt. The ammonium cation can be represented by N$^+$(R$^{11}$)$_4$. In N$^+$(R$^{11}$)$_4$, four R$^{11}$'s each independently represent a hydrogen atom or a hydrocarbon group. In a case where the ammonium cation is an organic ammonium cation, at least one of four R$^{11}$'s represents a hydrocarbon group. The hydrocarbon group is preferably an alkyl group. The alkyl group may be any alkyl group of linear, branched, and cyclic alkyl group, and is preferably a linear alkyl group. The number of carbons of the alkyl group is, for example, 1 to 10 and preferably 1 to 6. The four R$^{11}$'s may be same as each other or some or all of R$^{11}$'s may be different from each other. In N$^+$(R$^{11}$)$_4$, all of the four R$^{11}$'s may be hydrogen atoms or all thereof may be hydrocarbon groups. In N$^+$(R$^{11}$)$_4$, one to three R$^{11}$'s are hydrocarbon groups and R$^{11}$'s other than the hydrocarbon group is preferably a hydrogen atom.

Other Polymer Chain

The compound includes a polyalkyleneimine chain and may or may not include other polymer chains. In one aspect, the compound can include the partial structure, a polyalkyleneimine chain, and polymer chains other than the polyalkyleneimine chain. As one aspect of the other polymer chains, a vinyl polymer chain can be used. In addition, as another aspect of the other polymer chain, a polyester chain can be used.

Vinyl Polymer Chain

The vinyl polymer chain is a vinyl polymer chain represented by Formula 5.

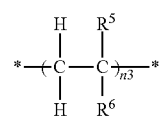

Formula 5

In Formula 5, $R^5$ represents a hydrogen atom or a substituent, $R^6$ represents a substituent, and n3 represents an integer equal to or greater than 2. Specific description regarding Formula 5 is below.

In Formula 5, $R^5$ represents a hydrogen atom or a substituent, and, for example, represents a hydrogen atom or a methyl group. $R^6$ represents a substituent. Examples of the substituent represented by $R^6$ include an alkyloxycarbonyl group, hydroxyalkyloxycarbonyl group, and aryl group, and specific examples thereof include substituents including specific examples of vinyl polymer which will be described later. The alkyl including an alkyloxycarbonyl group and the alkyl group substituted with a hydroxy group included in a hydroxyalkyloxycarbonyl group can be a linear alkyl group, a branched alkyl group, or a cyclic alkyl group. The number of carbons of the linear alkyl group and the branched alkyl group can be, for example, 1 to 20. The number of carbons of the cyclic alkyl group can be, for example, 3 to 20. The cyclic alkyl group includes a monocyclic alkyl group and a polycyclic alkyl group (for example, a bicycloalkyl group). An aryl group can be an aryl group having 6 to 20 carbon atoms, and specific examples thereof include a phenyl group.

In a case where the compound is a vinyl polymer chain, the structure of the vinyl polymer chain is derived from a structure of a vinyl monomer used for synthesis of the compound. The vinyl monomer is a compound including a vinyl group and/or a vinylidene group. Examples of the vinyl monomer include (meth)acrylic acid esters, crotonic acid esters, vinyl esters, maleic acid diesters, fumaric acid diesters, itaconic acid diesters, (meth)acrylamides, styrenes, vinyl ethers, vinyl ketones, olefins, maleimides, and (meth)acrylonitrile. The above expression of plurality is used as a meaning including a derivative thereof. For example, styrenes are used as a meaning including styrene and a styrene derivative. In addition, in the invention and the specification, "(meth)acryl" is used as a meaning including acryl and methacryl. For example, by using (meth)acrylic acid ester as the vinyl monomer, a compound including a poly(meth) acrylate chain as the vinyl polymer chain can be obtained. In addition, for example, by using styrene as the vinyl monomer, a compound including a polystyrene chain as the vinyl polymer chain can be obtained.

In the vinyl monomer, from a viewpoint of further improving durability, the preferable vinyl monomer is (meth)acrylic acid esters and styrenes, and more preferable vinyl monomer is (meth)acrylic acid esters. Specific examples of (meth)acrylic acid esters include methyl (meth) acrylate, ethyl (meth)acrylate, n-propyl (meth)acrylate, isopropyl (meth)acrylate, n-butyl (meth)acrylate, isobutyl (meth)acrylate, t-butyl (meth)acrylate, lauryl (meth)acrylate, amyl (meth)acrylate, n-hexyl (meth)acrylate, cyclohexyl (meth)acrylate, t-butylcyclohexyl (meth)acrylate, 2-ethylhexyl (meth)acrylate, t-octyl (meth)acrylate, dodecyl (meth)acrylate, octadecyl (meth)acrylate, acetoxyethyl (meth)acrylate, phenyl (meth)acrylate, 2-hydroxyethyl (meth)acrylate, 2-hydroxypropyl (meth)acrylate, 3-hydroxypropyl (meth)acrylate, 4-hydroxybutyl (meth)acrylate, 2-methoxyethyl (meth)acrylate, 2-ethoxyethyl (meth)acrylate, 2-(2-methoxyethoxy) ethyl (meth)acrylate, 3-phenoxy-2-hydroxypropyl (meth)acrylate, 2-chloroethyl (meth)acrylate, glycidyl (meth)acrylate, 3,4-epoxycyclohexylmethyl (meth)acrylate, vinyl (meth)acrylate, 2-phenylvinyl (meth) acrylate, 1-propenyl (meth)acrylate, allyl (meth)acrylate, 2-allyloxyethyl (meth)acrylate, propargyl (meth)acrylate, benzyl (meth)acrylate, diethylene glycol monomethyl ether (meth)acrylate, diethylene glycol monoethyl ether (meth) acrylate, triethylene glycol monomethyl ether (meth)acrylate, triethylene glycol monoethyl ether (meth)acrylate, propylene glycol monomethyl ether (meth)acrylate, polyethylene glycol monomethyl ether (meth)acrylate, polyethylene glycol monoethyl ether (meth)acrylate, β-phenoxyethoxyethyl (meth)acrylate, nonylphenoxy polyethylene glycol (meth)acrylate, dicyclopentenyl (meth)acrylate, dicyclopentenyloxyethyl (meth)acrylate, trifluoroethyl (meth) acrylate, octafluoropentyl (meth)acrylate, perfluorooctylethyl (meth)acrylate, dicyclopentanyl (meth)acrylate, tribromophenyl (meth)acrylate, tribromophenyloxyethyl (meth)acrylate, 7-butyrolactone (meth)acrylate, isobornyl (meth)acrylate, furfuryl (meth)acrylate, and tetrahydrofurfuryl (meth)acrylate.

Regarding the vinyl polymer chain, n3 in Formula 5 is an integer equal to or greater than 2, and is preferably an integer equal to or greater than 5, and more preferably an integer equal to or greater than 7, from a viewpoint of further improving durability. In addition, n3 can be, for example, an integer equal to or smaller than 100, and is preferably an integer equal to or smaller than 80 and more preferably an integer equal to or smaller than 70, from a viewpoint of improving dispersibility of the ferromagnetic powder. In Formula 5, n3 is an integer equal to or greater than 2, and thus, a plurality of $R^5$'s are included in Formula 5. A plurality of $R^5$'s may be the same as or different from each other. The same applies to $R^6$.

Hereinafter, specific examples of the vinyl polymer chain are shown. However, in a case where the compound includes the vinyl polymer chain, the included vinyl polymer chain is not limited to the following specific examples. In a case where the compound includes the vinyl polymer chain, only one kind of vinyl polymer chain may be included or two or more kinds of vinyl polymer chains having different structures may be included. The following n3 is the same as n3 in Formula 5 described above.

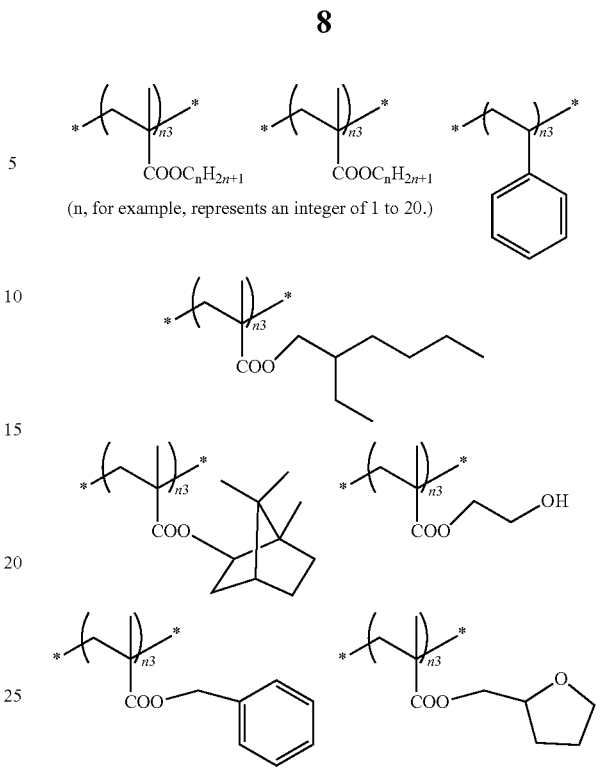

(n, for example, represents an integer of 1 to 20.)

Polyester Chain

In one aspect, the polyester chain is bonded to a nitrogen atom N included in the alkyleneimine chain represented by Formula 3 at * in Formula 3 by a carbonyl bond —(C=O)—, and —N—(C=O)— can be formed. In another aspect, alkyleneimine chain represented by Formula 4 and polyester chain can form a salt crosslinking group by a nitrogen cation $N^+$ in Formula 4 and an anionic group included in the polyester chain. As the salt crosslinking group, a group formed by an oxygen anion $O^-$ included in the polyester chain and $N^+$ in Formula 4 can be used.

As the polyester chain which is bonded to the nitrogen atom N included in the alkyleneimine chain represented by Formula 3 by a carbonyl bond —(C=O)—, a polyester chain represented by Formula 6 can be used. The polyester chain represented by Formula 6 can be bonded to the alkyleneimine chain represented by Formula 3 by forming —N—(C=O)— by the nitrogen atom included in the alkyleneimine chain and the carbonyl bond —(C=O)— included in the polyester chain at the binding site represented by *.

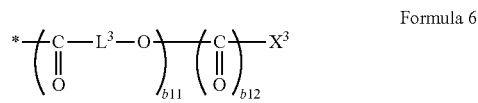

Formula 6

As the polyester chain to be bonded to the alkyleneimine chain represented by Formula 4 by forming a salt crosslinking group by $N^+$ in Formula 4 and an anionic group included in the polyester chain, a polyester chain represented by Formula 7 can be used. The polyester chain represented by Formula 7 can form a salt crosslinking group with $N^+$ in Formula 4 and an oxygen anion $O^-$.

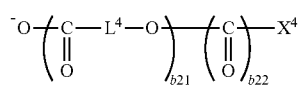

Formula 7

$L^3$ in Formula 6 and $L^4$ in Formula 7 each independently represent a divalent linking group. Examples of preferable divalent linking group include an alkylene group having 3 to 30 carbon atoms. In a case where the alkylene group includes a substituent, the number of carbon atoms of the alkylene group is the number of carbon atoms not including the number of carbon atoms of the substituent, as described above.

b11 in Formula 6 and b21 in Formula 7 each independently represent an integer equal to or greater than 2 and, is for example, an integer equal to or smaller than 200.

b12 in Formula 6 and b22 in Formula 7 each independently represent 0 or 1.

$X^3$ in Formula 6 and $X^4$ in Formula 7 each independently represent a hydrogen atom or a monovalent linking group. Examples of the monovalent linking group monovalent substituents selected from the group consisting of an alkyl group, a haloalkyl group (for example, a fluoroalkyl group), an alkoxy group, a polyalkyleneoxyalkyl group, and an aryl group.

The alkyl group may include a substituent or may be unsubstituted. As an alkyl group including a substituent, an alkyl group substituted with a hydroxy group (hydroxyalkyl group) and an alkyl group having one or more substituted hydrogen atoms are preferable. In addition, an alkyl group in which all of hydrogen atoms bonded to carbon atoms are substituted with halogen atoms (haloalkyl group) is also preferable. As the halogen atom, a fluorine atom, a chloride atom, a bromine atom, and the like can be used. As the alkyl group, an alkyl group having more preferably 1 to 30 carbon atoms, even more preferably 1 to 10 carbon atoms is used. The alkyl group may be linear, branched, or cyclic group. The same applies to the haloalkyl group.

Specific examples of substituted or unsubstituted alkyl group or haloalkyl group include a methyl group, an ethyl group, a propyl group, a butyl group, a pentyl group, a hexyl group, a heptyl group, an octyl group, a nonyl group, a decyl group, an undecyl group, a dodecyl group, a tridecyl group, a pentadecyl group, a hexadecyl group, a heptadecyl group, an octadecyl group, an eicosyl group, an isopropyl group, an isobutyl group, an isopentyl group, a 2-ethylhexyl group, a tert-octyl group, a 2-hexyldecyl group, a cyclohexyl group, a cyclopentyl group, a cyclohexylmethyl group, an octylcyclohexyl group, a 2-norbornyl group, a 2,2,4-trimethylpentyl group, an acetylmethyl group, an acetylethyl group, a hydroxymethyl group, a hydroxyethyl group, a hydroxypropyl group, a hydroxybutyl group, a hydroxypentyl group, a hydroxyhexyl group, a hydroxyheptyl group, a hydroxyoctyl group, a hydroxynonyl group, a hydroxydecyl group, a chloromethyl group, a dichloromethyl group, a trichloromethyl group, a bromomethyl group, a 1,1,1,3,3,3-hexafluoroisopropyl group, a heptafluoropropyl group, a pentadecafluoroheptyl group, a nonadecafluorononyl group, a hydroxyundecyl group, a hydroxydodecyl group, a hydroxypentadecyl group, a hydroxy heptadecyl group, and a hydroxy octadecyl group.

Examples of the alkoxy group include a methoxy group, an ethoxy group, a propyloxy group, a hexyloxy group, a methoxyethoxy group, a methoxyethoxy ethoxy group, and a methoxyethoxy ethoxymethyl group.

The polyalkyleneoxyalkyl group is a monovalent substituent represented by $R^{10}(OR^{11})n3(O)m1-$. $R^{10}$ represents an alkyl group, $R^{11}$ represents an alkylene group, n3 represents an integer equal to or greater than 2, and m1 represents 0 or 1.

The alkyl group represented by $R^{10}$ is the same as the alkyl group represented by $X^3$ or $X^4$. For the detail of the alkylene group represented by $R^{11}$, the description regarding the alkyl group represented by $X^3$ or $X^4$ can be applied, by replacing with an alkylene group obtained by removing one hydrogen atom from these alkylene groups (for example, methyl group or methylene group). n3 is an integer equal to or greater than 2, for example, equal to or smaller than 10, and preferably an integer equal to or smaller than 5.

The aryl group may include a substituent or form a condensed ring, and is more preferably an aryl group having 6 to 24 carbon atoms, and examples thereof include a phenyl group, a 4-methylphenyl group, a 4-phenylbenzoic acid, a 3-cyanophenyl group, a 2-chlorophenyl group, and a 2-naphthyl group.

The polyester chain represented by Formula 6 and the polyester chain represented by Formula 7 described above can have a polyester-derived structure obtained by a well-known polyester synthesis method. As the polyester synthesis method, lactone ring-opening polymerization disclosed in paragraphs 0056 and 0057 of JP2015-028830A can be used. However, the polyester chain is not limited to have the polyester-derived structure obtained by the lactone ring-opening polymerization, and can have a polyester-derived structure obtained by well-known polyester synthesis methods, for example, polycondensation of polyvalent carboxylic acid and polyhydric alcohol and polycondensation of hydroxycarboxylic acid.

Various Physical Properties of Compound

Weight-Average Molecular Weight

The weight-average molecular weight of the compound can be, for example, equal to or smaller than 80,000, is preferably equal to or smaller than 60,000, more preferably equal to or smaller than 35,000, even more preferably equal to or smaller than 34,000, further more preferably equal to or smaller than 30,000, still preferably equal to or smaller than 25,000, still more preferably equal to or smaller than 18,000, still even more preferably equal to or smaller than 15,000, still further more preferably equal to or smaller than 12,000, and still even further more preferably equal to or smaller than 10,000. From a viewpoint of further improving durability, the weight-average molecular weight is preferably smaller than a weight-average molecular weight of a binding agent used in combination in the magnetic layer. In addition, from a viewpoint of further improving durability, the weight-average molecular weight of the compound is preferably equal to or greater than 1,000, more preferably equal to or greater than 1,500, even more preferably equal to or greater than 2,000, and still preferably equal to or greater than 3,000.

In the invention and the specification, the average molecular weight (weight-average molecular weight and number average molecular weight which will be described later) is a value obtained by performing standard polystyrene conversion of a value measured by gel permeation chromatography (GPC). Unless otherwise noted, the average molecular weight shown in the examples which will be described later is a value (polystyrene-converted value) obtained by performing standard polystyrene conversion of a value measured using the GPC under the following measurement conditions.

GPC device: HLC-8220 (manufactured by Tosoh Corporation)

Guard Column: TSK guard column Super HZM-H

Column: TSK gel Super HZ 2000, TSK gel Super HZ 4000, TSK gel Super HZ-M (manufactured by Tosoh Corporation, 4.6 mm (inner diameter)×15.0 cm, three kinds of columns are linked in series Eluent: Tetrahydrofuran (THF), including stabilizer (2,6-di-t-butyl-4-methylphenol)

Eluent flow rate: 0.35 mL/min

Column temperature: 40° C.

Inlet temperature: 40° C.

Refractive index (RI) measurement temperature: 40° C.

Sample concentration: 0.3 mass %

Sample injection amount: 10 μL

Amine Value

From a viewpoint of further improving durability, an amine value of the compound is preferably equal to or greater than 0.10 mmol/g, more preferably equal to or greater than 0.15 mmol/g, even more preferably equal to or greater than 0.20 mmol/g, still preferably equal to or greater than 0.25 mmol/g. The amine value of the compound can be, for example, controlled depending on a percentage of the polyalkyleneimine chain occupying the structure of the compound. As the percentage of the polyalkyleneimine chain is high, the amine value of the compound tends to increase. In addition, the amine value of the compound can be, for example, equal to or smaller than 1.50 mmol/g, equal to or smaller than 1.40 mmol/g, equal to or smaller than 1.20 mmol/g, equal to or smaller than 1.00 mmol/g, equal to or smaller than 0.80 mmol/g, or equal to or smaller than 0.60 mmol/g.

In the invention and the specification, the amine value of the compound is a value measured by a potentiometric method (solvent: tetrahydrofuran/water=100/10 (volume ratio), titrant: 0.01 N (0.01 mol/L) hydrochloric acid) at room temperature, and is the value of mmol of hydrochloric acid necessary for neutralization of 1 g of the sample. In the invention and the specification, the "room temperature" is a temperature of 20° C. to 25° C.

Acid Value

From viewpoints of further improving durability and improving dispersibility of the ferromagnetic powder, an acid value of the compound is preferably equal to or greater than 0.20 mmol/g, more preferably equal to or greater than 0.30 mmol/g, even more preferably equal to or greater than 0.40 mmol/g, and still preferably equal to or greater than 0.50 mmol/g. The acid value of the compound can be controlled, for example, depending on a percentage of the partial structures selected from the group consisting of a partial structure represented by Formula 1 and a partial structure represented by Formula 2 occupying the structure of the compound. As the partial structure is high, the acid value of the compound tends to increase. In addition, the acid value of the compound can be, for example, equal to or smaller than 3.00 mmol/g, equal to or smaller than 2.50 mmol/g, or equal to or smaller than 2.00 mmol/g.

In the invention and the specification, the acid value of the compound is a value measured by a potentiometric method (solvent: tetrahydrofuran/water=100/10 (volume ratio), titrant: 0.01 N (0.01 mol/L) potassium hydroxide) at room temperature, and is the value of mmol of potassium hydroxide necessary for neutralization of 1 g of the sample.

Synthesis Method of Compound

The compound may be a compound including the polyalkyleneimine chain and the partial structure described above, and the synthesis method thereof is not particularly limited. The compound can be a random copolymer and a block copolymer. For example, by reacting a polyalkyleneimine chain-containing polymer with acid anhydride, acid modification of the polyalkyleneimine chain-containing polymer can be performed to introduce the partial structure represented by Formula 1 and/or the partial structure represented by Formula 2. The acid anhydride, for example, can react with an unreacted amino group of a polyalkyleneimine chain of the polyalkyleneimine chain-containing polymer. Regarding the reaction conditions of the acid modification, a well-known technology can be used.

As the acid anhydride which can be used for acid modification, the following acid anhydride can be used, for example.

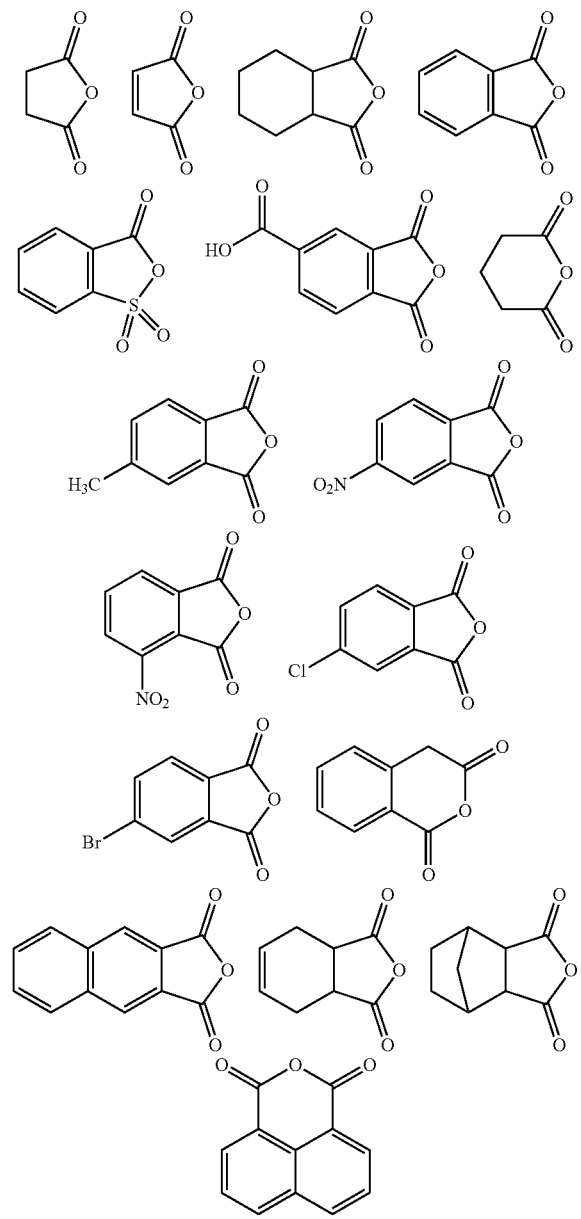

As one aspect of the polyalkyleneimine chain-containing polymer subjected to the acid modification, a polymer including a polyalkyleneimine chain and a vinyl polymer chain can be used. By causing a reaction between polyalkyleneimine and a vinyl polymer including a functional group capable of reacting with an amino group on one terminal (hereinafter, also referred to as an "intermediate"), it is possible to synthesis the polymer by forming a bond by the amino group included in polyalkyleneimine and the functional group. The bond can be covalent bond or ion bond (formation of salt crosslinking group), as described above. Examples of the functional group capable of reacting with the amino group included in the intermediate include a functional group capable of causing a condensation reaction between an amino group and acid, a functional group capable of causing an acid formation reaction between an amino group and acid, and a functional group causing an addition reaction of an amino group, and specific examples thereof include a carboxy group, an acrylate group, a methacrylate group, and an isocyanate group. The intermediate, for example, is possible to synthesize by reacting one or more kinds of vinyl monomer and the compound including a functional group capable of reacting with an amino group in a well-known reaction solvent. As the compound including a functional group capable of reacting with an amino group, a thiol compound including one functional group capable of reacting with an amino group and one thiol group in one molecule can be used. The thiol compound can function as a chain transfer agent. Examples of the thiol compound include mercaptopropionic acid, thioglycolic acid, thiomalic acid, thiolactic acid, 2-mercaptobenzoic acid, 3-mercaptobenzoic acid, and 4-mercaptobenzoic acid. In addition, the synthesis reaction of the intermediate can be performed using a well-known polymerization initiator. Regarding the reaction conditions, a well-known technology regarding the polymerization reaction of the vinyl polymer and a well-known technology regarding the reaction of the thiol compound can be used. The weight-average molecular weight of the intermediate can be, for example, 1,000 to 30,000 and is preferably 1,500 to 25,000.

The polyalkyleneimine is a polymer obtained by ring opening polymerization of alkyleneimine. The polyalkyleneimine can be synthesized by a well-known polymerization reaction and can also be purchased as a commercially available product. In the invention and the specification, the "polymer" is used as a meaning including a homopolymer and a copolymer. As the polyalkyleneimine, polyalkyleneimine having a number average molecular weight of 200 to 10,000 is suitable.

By reacting polyalkyleneimine and the intermediate, the polymer including the polyalkyleneimine chain and the vinyl polymer chain can be obtained by forming a bond by the amino group included in polyalkyleneimine and the functional group included in the intermediate. Regarding a mixing ratio of polyalkyleneimine and the intermediate in the reaction described above, a mol number of the functional group included in the intermediate with respect to 1 mol of the amino group included in polyalkyleneimine can be 0.20 to 1.20 mol and is preferably 0.40 to 1.10 mol. Regarding the reaction conditions of the reaction, a well-known technology can be used.

As one aspect of the polyalkyleneimine chain-containing polymer subjected to the acid modification, a polymer including a polyalkyleneimine chain and a polyester chain can also be used. For details of the synthesis method of such a polymer, a description disclosed in paragraphs 0026 to 0070 of JP2015-028830A can be referred to. In a case where the compound including the polyalkyleneimine chain and the partial structure described above includes a polyester chain, a number-average molecular weight of polyester used for synthesizing this compound is preferably equal to or greater than 200, more preferably equal to or greater than 400, and even more preferably equal to or greater than 500. In addition, the number-average molecular weight of polyester is preferably equal to or smaller than 100,000 and more preferably equal to or smaller than 50,000. The number-average molecular weight of polyester shown in examples which will be described later is a value obtained by performing standard polystyrene conversion of a value measured by GPC under the following measurement conditions.

Measurement device: HLC-8220 GPC (manufactured by Tosoh Corporation)

Column: TSK gel Super HZ2000/TSK gel Super HZ 4000/TSK gel Super HZ-M (manufactured by Tosoh Corporation)

Eluent: Tetrahydrofuran (THF)

Flow rate: 0.35 mL/min

Column temperature: 40° C.

Detector: Refractive index (RI) detector

Content of Compound

A content of the compound is preferably equal to or greater than 0.5 parts by mass, more preferably equal to or greater than 1.0 parts by mass, even more preferably equal to or greater than 3.0 parts by mass, still preferably equal to or greater than 5.0 parts by mass, still more preferably equal to or greater than 10.0 parts by mass, still even more preferably equal to or greater than 15.0 parts by mass, and still further more preferably equal to or greater than 20.0 parts by mass, with respect to 100.0 parts by mass of the ferromagnetic powder in the magnetic layer, from a viewpoint of the improvement of durability. Meanwhile, in order to improve a recording density, it is preferable to increase a filling percentage of the ferromagnetic powder in the magnetic layer. From this viewpoint, the content of the component other than the ferromagnetic powder is preferably relatively low. From this viewpoint, the content of the compound in the magnetic layer is preferably equal to or smaller than 50.0 parts by mass, more preferably equal to or smaller than 40.0 parts by mass, and even more preferably equal to or smaller than 35.0 parts by mass, with respect to 100.0 parts by mass of the ferromagnetic powder. The same also applies to the content of the compound with respect to 100.0 parts by mass of the ferromagnetic powder in the composition for a magnetic recording medium according to one embodiment of the invention. The compound may be included in a non-magnetic layer and/or a back coating layer which will be described later, in order to improve hardness of each layer, for example. Regarding the content of the compound in each layer in this case, the content thereof with respect to 100.0 parts by mass of the ferromagnetic powder can be used by replacing the content thereof with respect to 100.0 parts by mass of the non-magnetic powder.

Ferromagnetic Powder

The magnetic recording medium includes a ferromagnetic powder and a binding agent in a magnetic layer, together with the compound described above. As the ferromagnetic powder, ferromagnetic powder normally used in the magnetic layer of various magnetic recording media can be used. It is preferable to use ferromagnetic powder having a small average particle size, from a viewpoint of improvement of recording density of the magnetic recording medium. From this viewpoint, ferromagnetic powder having an average particle size equal to or smaller than 50 nm is preferably used as the ferromagnetic powder. However, as the average particle size of the ferromagnetic powder decreases, it is difficult to improve dispersibility of the ferromagnetic powder. With respect to this, in one embodiment, the compound can also contribute to the improvement of dispersibility of the ferromagnetic powder. By improving the dispersibility of the ferromagnetic powder in the magnetic layer, it is possible to increase electromagnetic conversion characteristics of the magnetic recording medium. The average particle size of the ferromagnetic powder is more preferably equal to or smaller than 40 nm, even more preferably equal to or smaller than 30 nm, still preferably equal to or smaller than 20 nm, and still more preferably smaller than 20 nm. On the other hand, from a viewpoint of stability of magnetization, the average particle size of the ferromagnetic powder is preferably equal to or greater than 5 nm, more preferably equal to or greater than 8 nm, and even more preferably equal to or greater than 10 nm. According to the studies of the inventors, as the average particle size of the ferromagnetic powder decreases, the durability of the magnetic recording medium tends to easily decrease in the high temperature and high humidity environment. With respect to this, the compound can contribute to the control of such a decrease of the durability.

As a preferred specific example of the ferromagnetic powder, a hexagonal ferrite powder can be used. For details of the hexagonal ferrite powder, descriptions disclosed in paragraphs 0012 to 0030 of JP2011-225417A, paragraphs 0134 to 0136 of JP2011-216149A, paragraphs 0013 to 0030 of JP2012-204726A, and paragraphs 0029 to 0084 of JP2015-127985A can be referred to. In the invention and the specification, the "hexagonal ferrite powder" is a ferromagnetic powder having a hexagonal ferrite type crystalline structure detected as a main phase by an X-ray diffraction analysis. The main phase is a structure in which a diffraction peak of the highest hardness is belonged in an X-ray diffraction spectrum obtained by the X-ray diffraction analysis. For example, in a case where the diffraction peak of the highest hardness in the X-ray diffraction spectrum obtained by the X-ray diffraction analysis is belonged to the hexagonal ferrite type crystalline structure, it is determined that the hexagonal ferrite type crystalline structure is detected as a main phase. In a case where only a single structure is detected by the X-ray diffraction analysis, the detected structure is set as the main phase. The hexagonal ferrite type crystalline structure includes at least an iron atom, a divalent metal atom, or an oxygen atom as constituent atoms. The divalent metal atom is a metal atom which can be a divalent cation as ion, and examples thereof include an alkali earth metal atom such as a strontium atom, a barium atom, or a calcium atom, and a lead atom. However, the divalent metal atom does not include a rare earth atom. In the invention and specification, the hexagonal strontium ferrite powder is a powder in which the main divalent metal atom is a strontium atom, and the hexagonal barium ferrite powder is a powder in which the main divalent metal atom is a barium atom. The main divalent metal atom is a divalent metal atom having the greatest content occupying the divalent metal atoms included in this powder based on atom %.

As a preferred specific example of the ferromagnetic powder, a metal powder can also be used. For details of the metal powder, descriptions disclosed in paragraphs 0137 to 0141 of JP2011-216149A and paragraphs 0009 to 0023 of JP2005-251351A can be referred to, for example.

As a preferred specific example of the ferromagnetic powder, an ε-iron oxide powder can also be used. In the invention and the specification, the "ε-iron oxide powder" is a ferromagnetic powder having an ε-iron oxide type crystalline structure detected as a main phase by an X-ray diffraction analysis. For example, in a case where the diffraction peak of the highest hardness in the X-ray diffraction spectrum obtained by the X-ray diffraction analysis is belonged to the ε-iron oxide type crystalline structure, it is determined that the ε-iron oxide type crystalline structure is detected as a main phase. As a producing method of the ε-iron oxide powder, a producing method from a goethite, and a reverse micelle method are known. All of the producing method is well known. For example, for a method of producing the ε-iron oxide powder in which a part of Fe is substituted with a substitutional atom such as Ga, Co, Ti, Al, or Rh, a description disclosed in J. Jpn. Soc. Powder Metallurgy Vol. 61 Supplement, No. S1, pp. S280-S284, J. Mater. Chem. C, 2013, 1, pp. 5200-5206 can be referred to, for example. However, the producing method of the ε-iron oxide powder which can be used as the ferromagnetic powder in the magnetic layer is not limited.

In the invention and the specification, average particle sizes of various powder such as the ferromagnetic powder and the like are values measured by the following method with a transmission electron microscope, unless otherwise noted.

The powder is imaged at a magnification ratio of 100,000 with a transmission electron microscope, the image is printed on photographic printing paper so that the total magnification of 500,000 to obtain an image of particles configuring the powder. A target particle is selected from the obtained image of particles, an outline of the particle is traced with a digitizer, and a size of the particle (primary particle) is measured. The primary particle is an independent particle which is not aggregated.

The measurement described above is performed regarding 500 particles randomly extracted. An arithmetical mean of the particle size of 500 particles obtained as described above is an average particle size of the powder. As the transmission electron microscope, a transmission electron microscope H-9000 manufactured by Hitachi, Ltd. can be used, for example. In addition, the measurement of the particle size can be performed by well-known image analysis software, for example, image analysis software KS-400 manufactured by Carl Zeiss. The average particle size shown in examples which will be described later is a value measured by using transmission electron microscope H-9000 manufactured by Hitachi, Ltd. as the transmission electron microscope, and image analysis software KS-400 manufactured by Carl Zeiss as the image analysis software, unless otherwise noted. In the invention and the specification, the powder means an aggregate of a plurality of particles. For example, the ferromagnetic powder means an aggregate of a plurality of ferromagnetic particles. The aggregate of the plurality of particles not only includes an aspect in which particles configuring the aggregate are directly in contact with each other, but also includes an aspect in which a binding agent or an additive which will be described later is interposed between the particles.

As a method of collecting a sample powder from the magnetic recording medium in order to measure the particle size, a method disclosed in paragraph of 0015 of JP2011-048878A can be used, for example.

In the invention and the specification, unless otherwise noted, (1) in a case where the shape of the particle observed in the particle image described above is a needle shape, a fusiform shape, or a columnar shape (here, a height is greater than a maximum long diameter of a bottom surface), the size (particle size) of the particles configuring the powder is shown as a length of a long axis configuring the particle, that is, a long axis length, (2) in a case where the shape of the particle is a planar shape or a columnar shape (here, a thickness or a height is smaller than a maximum long diameter of a plate surface or a bottom surface), the particle size is shown as a maximum long diameter of the plate surface or the bottom surface, and (3) in a case where the shape of the particle is a sphere shape, a polyhedron shape, or an unspecified shape, and the long axis configuring the particles cannot be specified from the shape, the particle size is shown as an equivalent circle diameter. The equivalent circle diameter is a value obtained by a circle projection method.

In addition, regarding an average acicular ratio of the powder, a length of a short axis, that is, a short axis length of the particles is measured in the measurement described above, a value of (long axis length/short axis length) of each particle is obtained, and an arithmetical mean of the values obtained regarding 500 particles is calculated. Here, unless otherwise noted, in a case of (1), the short axis length as the definition of the particle size is a length of a short axis configuring the particle, in a case of (2), the short axis length is a thickness or a height, and in a case of (3), the long axis and the short axis are not distinguished, thus, the value of (long axis length/short axis length) is assumed as 1, for convenience.

In addition, unless otherwise noted, in a case where the shape of the particle is specified, for example, in a case of definition of the particle size is (1), the average particle size is an average long axis length, in a case of the definition (2), the average particle size is an average plate diameter. In a case of the definition (3), the average particle size is an average diameter (also referred to as an average particle diameter).

The content (filling percentage) of the ferromagnetic powder of the magnetic layer is preferably 50% to 90% by mass and more preferably 60% to 90% by mass. The components other than the ferromagnetic powder of the magnetic layer are at least a binding agent or the compound and one or more kinds of additives may be randomly included. A high filling percentage of the ferromagnetic powder in the magnetic layer is preferable from a viewpoint of improvement recording density.

Binding Agent and Curing Agent

The magnetic recording medium is a coating-type magnetic recording medium and includes a binding agent in the magnetic layer. The binding agent is one or more kinds of resin. As the binding agent, various resins normally used as a binding agent of a coating-type magnetic recording medium can be used. For example, as the binding agent, a resin selected from a polyurethane resin, a polyester resin, a polyamide resin, a vinyl chloride resin, an acrylic resin obtained by copolymerizing styrene, acrylonitrile, or methyl methacrylate, a cellulose resin such as nitrocellulose, an epoxy resin, a phenoxy resin, and a polyvinylalkylal resin such as polyvinyl acetal or polyvinyl butyral can be used alone or a plurality of resins can be mixed with each other to be used. Among these, a polyurethane resin, an acrylic resin, a cellulose resin, and a vinyl chloride resin are preferable. These resins may be homopolymers or copolymers. These resins can be used as the binding agent even in the non-magnetic layer and/or a back coating layer which will be described later.

For the binding agent described above, description disclosed in paragraphs 0028 to 0031 of JP2010-024113A can be referred to. An average molecular weight of the resin used as the binding agent can be, for example, 35,000 to 200,000 as a weight-average molecular weight. In addition, the weight-average molecular weight of the resin used as the binding agent is preferably smaller than the weight-average molecular weight of the compound. The content of the binding agent in the magnetic layer can be, for example, 5.0 to 50.0 parts by mass and s preferably 10.0 to 30.0 parts by mass, with respect to 100.0 parts by mass of the ferromagnetic powder. In the invention and the specification, a given component may be used alone or in combination of two or more kinds thereof, unless otherwise noted. In a case where two or more kinds are used, in the invention and the specification, the content regarding a given component is a total content of the two or more kinds.

In addition, a curing agent can also be used together with the resin which can be used as the binding agent. As the curing agent, in one aspect, a thermosetting compound which is a compound in which a curing reaction (crosslinking reaction) proceeds due to heating can be used, and in another aspect, a photocurable compound in which a curing reaction (crosslinking reaction) proceeds due to light irradiation can be used. At least a part of the curing agent is included in the magnetic layer in a state of being reacted (crosslinked) with other components such as the binding agent, by proceeding the curing reaction in the magnetic layer forming step. This point is the same as regarding a layer formed by using a composition, in a case where the composition used for forming the other layer includes the curing agent. The preferred curing agent is a thermosetting compound, polyisocyanate is suitable. For details of the polyisocyanate, descriptions disclosed in paragraphs 0124 and 0125 of JP2011-216149A can be referred to, for example. The amount of the curing agent can be, for example, 0 to 80.0 parts by mass with respect to 100.0 parts by mass of the binding agent in the magnetic layer forming composition, and is preferably 50.0 to 80.0 parts by mass, from a viewpoint of improvement of hardness of the magnetic layer.

Additives

The magnetic layer includes the compound, ferromagnetic powder and the binding agent, and may include one or more kinds of additives, if necessary. As the additives, the curing agent described above is used as an example. In addition, examples of the additive included in the magnetic layer include non-magnetic powder (for example, inorganic powder or carbon black), a lubricant, a dispersing agent, a dispersing assistant, an antibacterial agent, an antistatic agent, and an antioxidant. As the non-magnetic powder, non-magnetic powder which can function as an abrasive, non-magnetic powder which can function as a projection formation agent which forms projections suitably protruded from the surface of the magnetic layer, and the like can be used. As the additives, a commercially available product can be suitably selected according to the desired properties or manufactured by a well-known method, and can be used with any amount. For example, regarding the lubricant, a description disclosed in paragraphs 0030 to 0033, 0035, and 0036 of JP2016-126817A can be referred to. The non-magnetic layer may include a lubricant. Regarding the lubricant included in the non-magnetic layer, a description disclosed in paragraphs 0030, 0031, 0034, 0035, and 0036 of JP2016-126817A can be referred to. Regarding the dispersing agent, a description disclosed in paragraphs 0061 and 0071 of JP2012-133837A can be referred to. The dispersing agent may be included in the non-magnetic layer. Regarding the dispersing agent included in the non-magnetic layer, a description disclosed in paragraph 0061 of JP2012-133837A can be referred to.

Preparation of Magnetic Layer Forming Composition

The magnetic layer can be formed using a magnetic layer forming composition including various components described above. The magnetic layer forming composition generally includes a solvent. As the solvent, an organic solvent used for manufacturing a coating-type magnetic recording medium can be generally used. Specifically, ketones such as acetone, methyl ethyl ketone, methyl isobutyl ketone, diisobutyl ketone, cyclohexanone, isophorone, or tetrahydrofuran, alcohols such as methanol, ethanol, propanol, butanol, isobutyl alcohol, isopropyl alcohol, or methylcyclohexanol, esters such as methyl acetate, butyl acetate, isobutyl acetate, isopropyl acetate, ethyl lactate, or glycol acetate, glycol ethers such as glycol dimethyl ether, glycol monoethyl ether, or dioxane, aromatic hydrocarbons such as benzene, toluene, xylene, cresol, or chlorobenzene, chlorinated hydrocarbons such as methylene chloride, ethylene chloride, carbon tetrachloride, chloroform, ethylene chlorohydrin, or dichlorobenzene, N, N-dimethylformamide, hexane, and the like can be used with any ratio. Among these, an organic solvent including ketones (ketone-based organic solvent) is preferably used, from viewpoints of solubility of the binding agent normally used in the magnetic recording medium and adsorption of the binding agent to the surface of ferromagnetic powder. The amount of the solvent in the magnetic layer forming composition may be the same as the amount of the magnetic layer forming composition of the typical coating-type magnetic recording medium.

The magnetic layer forming composition can be prepared by adding and mixing the various components described above at the same time or any order. The preparation method of the composition is not particularly limited, and a well-known technology regarding the preparation of the magnetic layer forming composition of the coating-type magnetic recording medium can be used.

Non-Magnetic Layer

Next, the non-magnetic layer will be described. The magnetic recording medium may include a magnetic layer directly on the surface of the non-magnetic support or may include a magnetic layer on the surface of the non-magnetic support directly or indirectly through the non-magnetic layer including the non-magnetic powder and the binding agent. The non-magnetic powder used in the non-magnetic layer may be inorganic powder or organic powder. In addition, carbon black and the like can be used. Examples of the inorganic powder include powder of metal, metal oxide, metal carbonate, metal sulfate, metal nitride, metal carbide, and metal sulfide. These non-magnetic powder can be purchased as a commercially available product or can be manufactured by a well-known method. For details thereof, descriptions disclosed in paragraphs 0146 to 0150 of JP2011-216149A can be referred to. For carbon black which can be used in the non-magnetic layer, descriptions disclosed in paragraphs 0040 and 0041 of JP2010-024113A can be referred to. The content (filling percentage) of the non-magnetic powder of the non-magnetic layer is preferably 50% to 90% by mass and more preferably 60% to 90% by mass.

In regards to other details of a binding agent or additives of the non-magnetic layer, the well-known technology regarding the non-magnetic layer can be applied. In addition, in regards to the type and the content of the binding agent, and the type and the content of the additive, for example, the well-known technology regarding the magnetic layer can be applied.

In the invention and the specification, the non-magnetic layer also includes a substantially non-magnetic layer including a small amount of ferromagnetic powder as impurities or intentionally, together with the non-magnetic powder. Here, the substantially non-magnetic layer is a layer having a residual magnetic flux density equal to or smaller than 10 mT, a layer having coercivity equal to or smaller than 7.96 kA/m(100 Oe), or a layer having a residual magnetic flux density equal to or smaller than 10 mT and coercivity equal to or smaller than 7.96 kA/m(100 Oe). It is preferable that the non-magnetic layer does not have a residual magnetic flux density and coercivity.

Non-Magnetic Support

Next, the non-magnetic support (hereinafter, also simply referred to as a "support") will be described. As the non-magnetic support, well-known components such as polyethylene terephthalate, polyethylene naphthalate, polyamide, polyamide imide, aromatic polyamide subjected to biaxial stretching are used. Among these, polyethylene terephthalate, polyethylene naphthalate, and polyamide are preferable. Corona discharge, plasma treatment, easy-bonding treatment, or heat treatment may be performed with respect to these supports in advance.

Back Coating Layer

The magnetic recording medium can also include a back coating layer including non-magnetic powder and a binding agent on a surface side of the non-magnetic support opposite to the surface side provided with the magnetic layer. The back coating layer preferably includes one or both of carbon black and inorganic powder. In regards to the binding agent included in the back coating layer and various additives which can be randomly included therein, a well-known technology regarding the back coating layer can be applied, and a well-known technology regarding the treatment of the magnetic layer and/or the non-magnetic layer can be applied. For example, for the back coating layer, descriptions disclosed in paragraphs 0018 to 0020 of JP2006-331625A and page 4, line 65, to page 5, line 38, of U.S. Pat. No. 7,029,774B can be referred to.

Various Thicknesses

A thickness of the non-magnetic support is preferably 3.0 to 20.0 μm, more preferably 3.0 to 10.0 μm, and even more preferably 3.0 to 6.0 μm.

A thickness of the magnetic layer can be optimized according to a saturation magnetization amount of a magnetic head used, a head gap length, a recording signal band, and the like. The thickness of the magnetic layer is preferably 10 nm to 150 nm, and is more preferably 20 nm to 120 nm, and even more preferably 30 nm to 100 nm from a viewpoint of realization of high-density recording. The magnetic layer may be at least one layer, or the magnetic layer can be separated to two or more layers having magnetic properties, and a configuration regarding a well-known multilayered magnetic layer can be applied. A thickness of the magnetic layer which is separated into two or more layers is a total thickness of the layers.

A thickness of the non-magnetic layer is, for example, 0.05 to 1.5 m and is preferably 0.1 to 1.0 μm.

A thickness of the back coating layer is preferably equal to or smaller than 0.9 μm and even more preferably 0.1 to 0.7 μm.

The thicknesses of various layers of the magnetic recording medium and the non-magnetic support can be acquired by a well-known film thickness measurement method. As an example, a cross section of the magnetic recording medium in a thickness direction is, for example, exposed by a well-known method of ion beams or microtome, and the exposed cross section is observed with a scanning electron microscope. In the cross section observation, various thicknesses can be acquired as a thickness acquired at any one portion of the cross section, or an arithmetical mean of thicknesses acquired at a plurality of portions of two or more portions, for example, two portions which are randomly extracted. In addition, the thickness of each layer may be acquired as a designed thickness calculated according to the manufacturing conditions.

Manufacturing Step

A step of preparing the composition for forming the magnetic layer, and the non-magnetic layer and the back coating layer which are randomly provided, can include at least a kneading step, a dispersing step, or a mixing step provided before and after these steps, if necessary. Each step may be divided into two or more stages. The component used in the preparation of each layer forming composition may be added at an initial stage or in a middle stage of each step. In addition, each raw material may be separately added in two or more steps. In order to prepare each layer forming composition, a well-known technology can be used. In the kneading step, an open kneader, a continuous kneader, a pressure kneader, or a kneader having a strong kneading force such as an extruder is preferably used. The details of the kneading processes of these kneaders are disclosed in JP1989-106338A (JP-H01-106338A) and JP1989-079274A (JP-H01-079274A). In addition, in order to disperse each layer forming composition, as a dispersion medium, at least one or more kinds of dispersion beads selected from the group consisting of glass beads and other dispersion beads can be used. As such dispersion beads, zirconia beads, titania beads, and steel beads which are dispersion beads having high specific gravity are suitable. These dispersion beads are preferably used by optimizing a particle diameter (bead diameter) and a filling percentage. As a disperser, a well-known disperser can be used. Each layer forming composition may be filtered by a well-known method before performing the coating step. The filtering can be performed by using a filter, for example. As the filter used in the filtering, a filter having a hole diameter of 0.01 to 3 µm (for example, filter made of glass fiber or filter made of polypropylene) can be used, for example.

The magnetic layer can be formed by directly applying the magnetic layer forming composition onto the surface of the non-magnetic support or through a step of performing multilayer coating with the non-magnetic layer forming composition in order or at the same time. The back coating layer can be formed through a step of applying a back coating layer forming composition onto a surface of the non-magnetic support opposite to the surface provided with the magnetic layer (or to be provided with the magnetic layer).

After the coating step, various processes such as a drying process, an alignment process of the magnetic layer, and a surface smoothing treatment (calender process) can be performed. Regarding the coating step and various processes, a well-known technology can be used, and for example, a description disclosed in paragraphs 0051 to 0057 of JP2010-024113 can be referred to. For example, as an alignment process, a homeotropic alignment process can be performed. The homeotropic alignment process can be performed by a well-known method such as a method using a polar opposing magnet. In an alignment zone, it is possible to control a drying position of a coating layer depending on a temperature of dry air, an air flow, or a transportation speed of the magnetic tape in the alignment zone. In addition, the coating layer may be preliminarily dried before being transported to the alignment zone.

The magnetic recording medium according to one embodiment of the invention can be a tape-shaped magnetic recording medium (magnetic tape). The magnetic tape is normally used to be accommodated and circulated in a magnetic tape cartridge. On the magnetic tape, a servo pattern can be formed by a well-known method, in order to perform head tracking servo in a magnetic recording and reproducing apparatus. The magnetic tape cartridge is mounted on the magnetic recording and reproducing apparatus, the magnetic tape runs in the magnetic recording and reproducing apparatus to bring the surface of the magnetic tape (surface of the magnetic layer) and the magnetic head into contact to slide on each other, and accordingly, the recording of information on the magnetic tape and reproducing thereof can be performed. However, the magnetic recording medium according to one embodiment of the invention is not limited to the magnetic tape. The magnetic recording medium according to one embodiment of the invention is suitable as various magnetic recording media (magnetic tape, or disk-shaped magnetic recording medium (magnetic disk) used in the sliding type magnetic recording and reproducing apparatus. The sliding type apparatus is an apparatus in which the surface of the magnetic layer and the magnetic head comes into contact with each other and slide on each other, in a case of recording information on the magnetic recording medium and/or reproducing the recorded information.

Composition for Magnetic Recording Medium

One aspect of the invention relates to a composition for a magnetic recording medium including a ferromagnetic powder, and the compound described above. The details of such a composition for a magnetic recording medium are as described regarding the magnetic recording medium according to one embodiment of the invention and the composition for a magnetic layer used for forming the same.

The composition for a magnetic recording medium may be a one pack type composition in which all components are mixed with each other, or may be a multi-liquid composition which is two or more pack type used by mixing a plurality of liquids for forming a magnetic layer.

The magnetic recording medium according to one embodiment of the invention described above can exhibit excellent durability in the high temperature and high humidity environment. In addition, the composition for a magnetic recording medium according to one embodiment of the invention can be used as the composition for forming the magnetic layer of the magnetic recording medium.

Magnetic Recording And Reproducing Apparatus

One aspect of the invention relates to a magnetic recording and reproducing apparatus including the magnetic recording medium and a magnetic head.

In the invention and the specification, the "magnetic recording and reproducing apparatus" means an apparatus which can perform at least one of the recording of information on a magnetic recording medium or the reproducing of the information recorded on a magnetic recording medium. Such an apparatus is generally called a drive. The magnetic recording and reproducing apparatus can be a sliding type magnetic recording and reproducing apparatus. A magnetic head included in the magnetic recording and reproducing apparatus can be a recording head which can perform the recording of information on a magnetic recording medium, and can be a reproducing head which can perform the reproducing of the information recorded on a magnetic recording medium. In addition, in one embodiment, the magnetic recording and reproducing apparatus can include both of a recording and a reproducing head as separate magnetic heads. In another aspect, the magnetic head included in the magnetic recording and reproducing apparatus can have a configuration in which one magnetic head includes both a recording element and a reproducing element. As the reproducing head, a magnetic head including a magnetoresistive (MR) element capable of sensitively reading information recorded on a magnetic recording medium as the reproducing element (MR head) is preferable. As the MR head, various well-known MR heads can be used. In addition, the magnetic head which performs the recording of information and/or reproducing of information may include a servo pattern reading element. Alternatively, as a head other than the magnetic head which performs the recording of information and/or reproducing of information, a magnetic head (servo head) including the servo pattern reading element may be included in the magnetic recording and reproducing apparatus.

In the magnetic recording and reproducing apparatus, the recording of information on a magnetic recording medium and the reproducing of information recorded on a magnetic recording medium can be performed by bringing the surface of the magnetic layer of the magnetic recording medium and the magnetic head into contact with each other to slide on each other. The magnetic recording and reproducing apparatus may include the magnetic recording medium according to one embodiment of the invention and a well-known technology can be applied for the other configuration. The magnetic recording medium according to one embodiment of the invention can exhibit excellent durability in the high temperature and high humidity environment, and accordingly, it is possible to prevent occurrence of chipping of the surface of the magnetic layer, in a case of performing the reproducing of information and/or the reproducing of information by bringing the surface of the magnetic layer and the magnetic head into contact with each other to slide on each other in the high temperature and high humidity environment. In one embodiment, the high temperature and high humidity environment can be an environment in which an atmosphere temperature is 30° C. to 50° C. and relative humidity is 50% to 90%.

EXAMPLES

Hereinafter, the invention will be described with reference to examples in details. However, the invention is not limited to aspects shown in the examples. "Parts" and "%" in the following description are based on mass, unless otherwise noted. "eq" in the following description indicates equivalent and SI unit is a unit not convertible. In addition, each step and each operation were performed under atmospheric pressure at a room temperature (atmosphere temperature of 20° C. to 25° C.).

The weight-average molecular weight and the number average molecular weight shown below are values obtained as polystyrene-converted values measured by GPC under the measurement conditions described above. In addition, the amine value and the acid value shown below are values obtained by the measurement method described above.

The introduction of each synthesis raw material to the compound finally synthesized at a ratio calculated from the used amount was confirmed with a measurement value of $^1$H-nuclear magnetic resonance (NMR), the weight-average molecular weight, the amine value, and the acid value.

Ferromagnetic Powder Used in Examples and Comparative Examples

Regarding the ferromagnetic powder in tables which will be described later, "SrFe" indicates a hexagonal strontium ferrite powder, and "BaFe" indicates a hexagonal barium ferrite powder. These are hexagonal ferrite powders prepared by a glass crystalline method. When average particle sizes of these hexagonal ferrite powders were measured by the method described above, values shown in tables which will be described later were obtained.

In the tables which will be described later, the "ε-iron oxide" is an ε-iron oxide powder prepared by the following method.

3.6 g of ammonia aqueous solution having a concentration of 25% was added to a material obtained by dissolving 8.3 g of iron (III) nitrate nonahydrate, 1.25 g of gallium (III) nitrate octahydrate, 189 mg of cobalt (III) nitrate hexahydrate, 152 mg of titanium (III) sulfate, and 1.0 g of polyvinyl pyrrolidone (PVP) in 92.3 g of pure water, while stirring by using a magnetic stirrer, in an atmosphere under the conditions of an atmosphere temperature of 25° C., and the mixture was stirred for 2 hours still under the temperature condition of the atmosphere temperature of 25° C. A citric acid solution obtained by dissolving 0.85 g of citric acid in 9.15 g of pure water was added to the obtained solution and stirred for 1 hour. The powder precipitated after the stirring was collected by centrifugal separation, washed with pure water, and dried in a heating furnace at a furnace inner temperature of 80° C.

800 g of pure water was added to the dried powder and the powder was dispersed in water again, to obtain a dispersion liquid. The obtained dispersion liquid was heated to a liquid temperature of 50° C., and 40 g of ammonia aqueous solution having a concentration of 25% was added dropwise while stirring. The stirring was performed for 1 hour while holding the temperature of 50° C., and 13.3 mL of tetraethoxysilane (TEOS) was added dropwise and stirred for 24 hours. 51 g of ammonium sulfate was added to the obtained reaction solution, the precipitated powder was collected by centrifugal separation, washed with pure water, and dried in a heating furnace at a furnace inner temperature of 80° C. for 24 hours, and a precursor of ferromagnetic powder was obtained.

The heating furnace at a furnace inner temperature of 1029° C. was filled with the obtained precursor of ferromagnetic powder in the atmosphere and subjected to thermal treatment for 4 hours.

The thermal-treated precursor of ferromagnetic powder was put into sodium hydroxide (NaOH) aqueous solution having a concentration of 4 mol/L, the liquid temperature was held at 70° C., stirring was performed for 24 hours, and accordingly, a silicon acid compound which was an impurity was removed from the thermal-treated precursor of ferromagnetic powder.

After that, by the centrifugal separation process, ferromagnetic powder obtained by removing the silicon acid compound was collected and washed with pure water, and ferromagnetic powder was obtained.

The composition of the obtained ferromagnetic powder was confirmed by Inductively Coupled Plasma-Optical Emission Spectrometry (ICP-OES), and Ga, Co, and Ti substitution type ε-iron oxide was obtained. In addition, the powder X-ray diffraction (XRD) was performed, and it was confirmed that the obtained ferromagnetic powder has a crystal structure of a single phase which is an s phase not including a crystal structure of an a phase and a γ phase from the peak of the XRD pattern. When the average particle size of this ε-iron oxide powder was measured by the method described above, values shown in the tables which will be described later were obtained.

Compounds Used in Examples and Comparative Examples

Synthesis of Compound 1

Synthesis of Intermediate P-1

45.0 g of PGMEA (reaction solvent) was added to 500 mL three-neck flask under the nitrogen atmosphere. After increasing the liquid temperature to 75° C., 6.4 g of MPA (thiol compound), 90.1 g of MMA (vinyl monomer), 180.1 g of PGMEA (reaction solvent), and 0.14 g of V-601 (polymerization initiator) were mixed with each other in advance and added dropwise for 2 hours. After the dropwise addition, 0.14 g of V-601 was added and stirred for 2 hours. In addition, the liquid temperature was increased to 90° C., and the mixture was stirred for 2 hours to obtain a PGMEA solution of the intermediate P-1 having the following structure. The mol number of MMA (vinyl monomer) used in the above is 15 mols with respect to 1 mol of MPA (thiol compound). The weight-average molecular weight of the intermediate P-1 synthesized here was 3,500.

Structure of Intermediate P-1

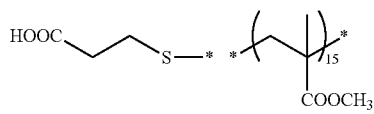

Synthesis of Compound 1

2.4 g of polyethyleneimine (SP-006 manufactured by Nippon Shokubai Co., Ltd.) and 144.8 g of the 30% PGMEA solution of the intermediate P-1 were mixed with each other and heated to the liquid temperature of 110° C. for 3 hours, and accordingly, a polymer including a polyethyleneimine chain and a vinyl polymer chain (polyethyleneimine chain-containing polymer) was obtained.

The above synthesis scheme is shown below. In the following synthesis scheme, a, b, and c each independently represent a polymerization molar ratio of a repeating unit, are 0 to 50, and a+b+c=100. k, l, m1, and m2 each independently represent a polymerization molar ratio of a repeating unit, k is 10 to 90, l is 0 to 80, m1 and m2 are each independently 0 to 70, and k+l+m1+m2=100. n represents a repeating unit and is 2 to 100.

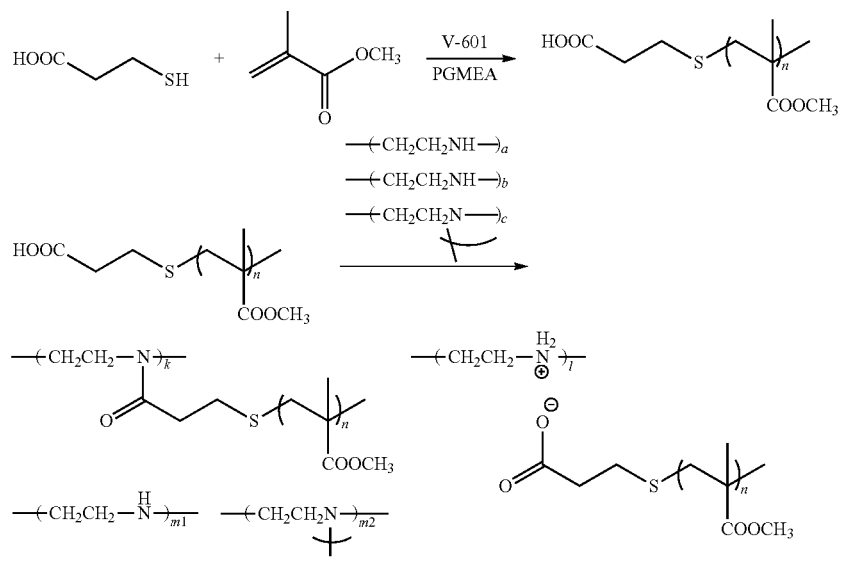

The reaction solution after the synthesis of the polymer was heated to a liquid temperature of 70° C., the kind of acid anhydride shown in Table 1 was added (additive amount: see Table 1) and stirred for 1 hour, and an acid-modified compound 1 was synthesized. By the acid modification, one partial structure represented by Formula 1 is introduced per molecule in the compound 1.

The abbreviations described above respectively indicate the followings.

MPA: Mercaptopropionic acid

MMA: Methyl methacrylate

PGMEA: Propylene glycol monomethyl ether acetate

V-601: Dimethyl 2,2'-azobis (2-methyl propionate) (manufactured by Wako Pure Chemical Corporation)

SP-006: Polyethyleneimine SP-006 manufactured by Nippon Shokubai Co., Ltd., number-average molecular weight of 600

Synthesis of Compounds 2 to 6

A polyalkyleneimine chain-containing polymer was synthesized in the same manner as described above, except that the used amounts of polyethyleneimine (SP-006 manufactured by Nippon Shokubai Co., Ltd.) and 30% PGMEA solution of the intermediate P-1 were changed as shown in Table 1, and compounds 2 to 6 were synthesized in the same manner as described above, except that the kind of acid anhydride shown in Table 1 was added with the additive amount shown in Table 1 was added for the acid modification of the synthesized polymer.

The evaluation results of physical properties of the compounds 1 to 6 are shown in Table 1.

TABLE 1

| | Synthesis of polyalkyleneimine chain-containing polymer | | | | Physical properties of compound | | |
|---|---|---|---|---|---|---|---|
| | Polyalkyleneimine Used amount (g) | 30% PGMEA solution of intermediate P-1 Used amount (g) | Acid anhydride Kind | Additive amount (g) | Weight-average molecular weight | Amine value (mmol/g) | Acid value (mmol/g) |
| Compound 1 | 2.4 | 241.3 | Phthalic anhydride | 0.4 | 4,300 | 0.30 | 0.59 |
| Compound 2 | 2.4 | 150.8 | Phthalic anhydride | 2.5 | 3,800 | 0.29 | 0.90 |
| Compound 3 | 2.4 | 60.3 | Phthalic anhydride | 4.9 | 3,300 | 0.31 | 1.89 |
| Compound 4 | 2.4 | 241.3 | Succinic anhydride | 0.5 | 3,800 | 0.30 | 0.56 |
| Compound 5 | 2.4 | 241.3 | Sulfobenzoic anhydride | 0.5 | 3,800 | 0.30 | 0.55 |
| Compound 6 | 2.4 | 241.3 | Trimellitic anhydride | 0.5 | 3,800 | 0.30 | 1.11 |

Synthesis Compound 7

12.6 g n-octanoic acid (manufactured by Wako Pure Chemical Corporation) as carboxylic acid, 100 g of ε-caprolactone (PLACCEL M manufactured by Daicel Corporation) as lactone, and 2.2 g of monobutyltin oxide (manufactured by Wako Pure Chemical Corporation) ($C_4H_9Sn(O)OH$) as a catalyst were mixed with each other in 500 mL three-neck flask, and heated to a liquid temperature of 160° C. for 1 hour. 100 g of ε-caprolactone was added dropwise for 5 hours and further stirred for 2 hours. After that, the mixture was cooled to room temperature and polyester was obtained. A synthesis scheme is shown below. The number-average molecular weight of the polyester synthesized here was 7,500.

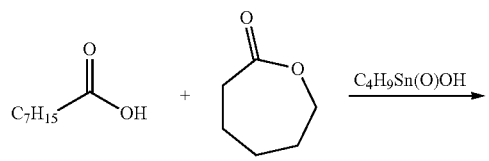

-continued 100.0 g of polyester synthesized as described above and the content of polyethyleneimine (SP-006 manufactured by Nippon Shokubai Co., Ltd.) shown in Table 2 were mixed with each other, and heated to a liquid temperature of 110° C. for 3 hours, and a polymer including a polyethyleneimine chain and a polyester chain (polyethyleneimine chain-containing polymer) was obtained.

The synthesis scheme of the above is shown below. In the following synthesis scheme, a, b, and c respectively show a polymerization molar ratio of a repeating unit and are in a range of 0 to 50, and a+b+c=100. l, m, n1, and n2 respectively show a polymerization molar ratio of a repeating unit, l is 10 to 90, m is 0 to 80, n1 and n2 are 0 to 70, and l+m+n1+n2=100.

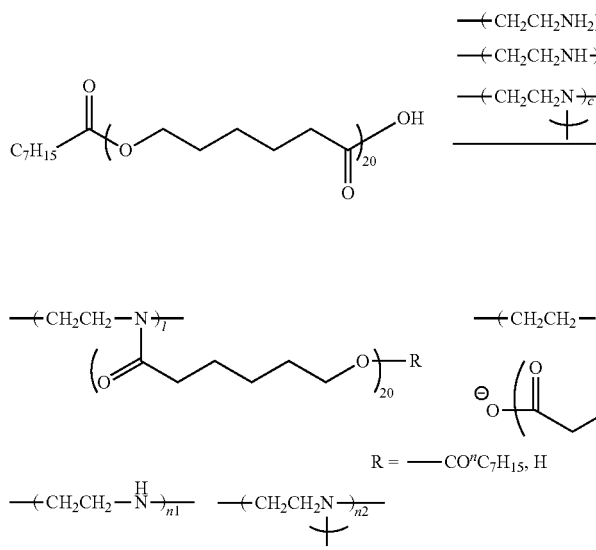

The reaction solution (concentration of solid contents: 100%) after the synthesis of the polymer was heated to a liquid temperature of 70° C., the kind of acid anhydride shown in Table 2 was added (additive amount: see Table 2) and stirred for 1 hour, and an acid-modified compound 7 was synthesized.

Synthesis of Compound 8

A polyalkyleneimine chain-containing polymer was synthesized in the same manner as described above, except that the used amount of polyethyleneimine (SP-006 manufactured by Nippon Shokubai Co., Ltd.) was changed as shown in Table 2, and a compound 8 was synthesized in the same manner as the synthesis of the compound 7, except that the kind of acid anhydride shown in Table 2 was added with the additive amount shown in Table 2 was added for the acid modification of the synthesized polymer.

The evaluation results of physical properties of the compounds 7 and 8 are shown in Table 2.

TABLE 2

| | Synthesis of polyalkyleneimine chain-containing polymer | | | | | | |
|---|---|---|---|---|---|---|---|
| | | 30% PGMEA solution of | Acid anhydride | | Physical properties of compound | | |
| | Polyalkyleneimine Used amount (g) | intermediate P-1 Used amount (g) | Kind | Amount (g) | Weight-average molecular weight | Amine value (mmol/g) | Acid value (mmol/g) |
| Compound 7 | 2.4 | 100.0 | Phthalic anhydride | 0.5 | 7,100 | 0.28 | 0.63 |
| Compound 8 | 2.4 | 100.0 | Trimellitic anhydride | 0.5 | 7,200 | 0.28 | 1.27 |

The kind of partial structures represented by Formula 1 or Formula 2 included in the compounds 1 to 8 and the number thereof included per molecule are shown in Table 3

TABLE 3

| | Acid anhydride used for acid modification | Partial structure represented by Formula 1/Formula 2 | Number of partial structures in the left column included per molecule |
|---|---|---|---|
| Compound 1 | Phthalic anhydride | 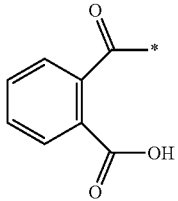 | 1 |
| Compound 2 | Phthalic anhydride | 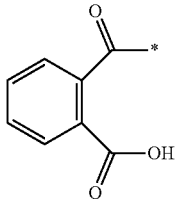 [SMILES: *C(=O)c1ccccc1C(=O)O] | 4 |
| Compound 3 | Phthalic anhydride | 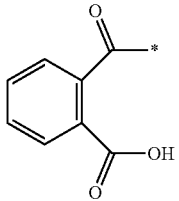 [SMILES: *C(=O)c1ccccc1C(=O)O] | 8 |
| Compound 4 | Succinic anhydride | 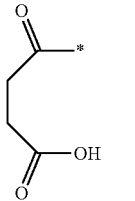 | 1 |

TABLE 3-continued

| Acid anhydride used for acid modification | Partial structure represented by Formula 1/Formula 2 | Number of partial structures in the left column included per molecule |
|---|---|---|
| Compound 5 Sulfobenzoic anhydride | [structure: benzene ring with C(=O)-* and SO2-OH groups] | 1 |
| Compound 6 Trimellitic anhydride | [structure: benzene ring with HOOC-, C(=O)-*, and -COOH groups] | 1 |
| Compound 7 Phthalic anhydride | [structure: benzene ring with C(=O)-* and -COOH groups] | 1 |
| Compound 8 Trimellitic anhydride | [structure: benzene ring with HOOC-, C(=O)-*, and -COOH groups] | 1 |

Example 1

(1) List of Magnetic Layer Forming Composition
Magnetic Liquid
Ferromagnetic powder (see Table 4): 100.0 parts
SO$_3$Na group-containing polyurethane resin: 14.0 parts
  (Weight-average molecular weight: 70,000, SO$_3$Na group: 0.4 meq/g)
Cyclohexanone: 150.0 parts
Methyl ethyl ketone: 150.0 parts
Oleic acid: 2.0 parts
Compound 1: 30.0 parts
Abrasive Solution
Abrasive Solution A
Alumina abrasive (average particle size: 100 nm): 3.0 parts
SO$_3$Na group-containing polyurethane resin: 0.3 parts
  (Weight-average molecular weight: 70,000, SO$_3$Na group: 0.3 meq/g)
Cyclohexanone: 26.7 parts
Abrasive Solution B
Diamond abrasive (average particle size: 100 nm): 1.0 part
SO$_3$Na group-containing polyurethane resin: 0.1 parts
  (Weight-average molecular weight: 70,000, SO$_3$Na group: 0.3 meq/g)
Cyclohexanone: 26.7 parts
Silica Sol
Colloidal silica (Average particle size: 100 nm): 0.2 parts
Methyl ethyl ketone: 1.4 parts
Other Components
Stearic acid: 2.0 parts
Butyl stearate: 6.0 parts
Polyisocyanate (CORONATE manufactured by Tosoh Corporation): 2.5 parts
Finishing Additive Solvent
Cyclohexanone: 200.0 parts
Methyl ethyl ketone: 200.0 parts
(2) List of Non-Magnetic Layer Forming Composition
Non-magnetic inorganic powder: α-iron oxide: 100.0 parts
Average particle size: 10 nm
Average acicular ratio: 1.9
Brunauer-Emmett-Teller (BET) specific surface area: 75 m$^2$/g
Carbon black (average particle size: 20 nm): 25.0 parts
SO$_3$Na group-containing polyurethane resin: 18.0 parts
  (Weight-average molecular weight: 70,000, SO$_3$Na group: 0.2 meq/g)
Stearic acid: 1.0 part
Cyclohexanone: 300.0 parts
Methyl ethyl ketone: 300.0 parts (3) List of Back Coating Layer Forming Composition
Non-magnetic inorganic powder α-iron oxide: 80.0 parts
Average particle size: 0.15 μm
Average acicular ratio: 7
BET specific surface area: 52 m²/g
Carbon black (average particle size: 20 nm): 20.0 parts
A vinyl chloride copolymer: 13.0 parts
Sulfonate group-containing polyurethane resin: 6.0 parts
Phenylphosphonic acid: 3.0 parts
Cyclohexanone: 155.0 parts
Methyl ethyl ketone: 155.0 parts
Stearic acid: 3.0 parts
Butyl stearate: 3.0 parts
Polyisocyanate: 5.0 parts
Cyclohexanone: 200.0 parts (4) Manufacturing of Magnetic Tape Various components of the magnetic liquid were dispersed by using a batch type vertical sand mill for 24 hours to prepare a magnetic liquid. As dispersion beads, zirconia beads having a particle diameter of 0.5 mm were used.

An abrasive solution was prepared by dispersing various components of the abrasive solution A and B described above by a batch type ultrasonic device (20 kHz, 300 W) for 24 hours.

The prepared magnetic liquid and the abrasive solution were mixed with the other components (silica sol, the other components, and the finishing additive solution) and the treatment (ultrasonic dispersion) was performed with a batch type ultrasonic device (20 kHz, 300 W) for 30 minutes. After that, the obtained mixture was filtered with a filter having a hole diameter of 0.5 μm, and a magnetic layer forming composition was prepared.

For the non-magnetic layer forming composition, the various components were dispersed by using a batch type vertical sand mill for 24 hours. As dispersion beads, zirconia beads having a particle diameter of 0.1 mm were used. The obtained dispersion liquid was filtered with a filter having a hole diameter of 0.5 μm, and a non-magnetic layer forming composition was prepared.

For the back coating layer forming composition, the various components described above excluding the lubricant (stearic acid and butyl stearate), polyisocyanate, and 200.0 parts of cyclohexanone were kneaded and diluted by an open kneader. Then, the obtained mixed liquid was subjected to a dispersion process of 12 passes, with a transverse beads mill dispersing device by using zirconia beads having a bead diameter of 1 mm, by setting a bead filling percentage as 80 volume %, a circumferential speed of rotor distal end as 10 m/sec, and a retention time for 1 pass as 2 minutes. After that, the remaining components were added into the obtained dispersion liquid and stirred with a dissolver. The obtained dispersion liquid described above was filtered with a filter having an average hole diameter of 1 μm and a back coating layer forming composition was prepared.

After that, the non-magnetic layer forming composition was applied on a support made of polyethylene naphthalate having a thickness of 5.0 μm so that the thickness after the drying becomes 100 nm, and dried, and the magnetic layer forming composition was applied thereon so that the thickness after the drying becomes 70 nm, and accordingly, a coating layer was formed. While this coating layer is wet, a homeotropic alignment process was performed by applying a magnetic field having a magnetic field strength of 0.6 T in a direction vertical to the surface of the coating layer, and the coating layer was dried. After that, the back coating layer forming composition was applied to a surface of the support on a side opposite to the surface where the non-magnetic layer and the magnetic layer are formed, so that the thickness after drying becomes 0.4 μm, and dried, and accordingly, a back coating layer was formed.

Then, a surface smoothing treatment (calender process) was performed with a calender configured of only a metal roll, at a speed of 100 m/min, linear pressure of 294 kN/m, and a surface temperature of a calender roll of 100° C., and the heating treatment was performed in the environment of the atmosphere temperature of 70° C. for 36 hours. After the heating treatment, the slitting was performed to have a width of ½ inches (1 inch is 0.0254 meters), and a magnetic tape was obtained.

Examples 2 to 24 and Comparative Examples 1 to 3

Each magnetic tape of Examples 2 to 24 and Comparative Examples 1 to 3 was manufactured by the same method as in Example 1, except that the compound shown in Table 4 was used as the additive of the magnetic layer and the ferromagnetic powder shown in Table 4 was used as the ferromagnetic powder of the magnetic layer.

Evaluation of Durability

Each magnetic tape (length of 100 m) tape was caused to run 600 passes under the environment of the atmosphere temperature of 37° C. and relative humidity of 87%, by bringing the surface of the magnetic layer and the magnetic head into contact with each other and slide on each other at a running speed of 3 m/sec in a linear tester.

A degree of chipping of the surface of the magnetic layer after the running was observed with an optical microscope (Nikon EclipseLV150, observation magnification: 50 times), and the durability was evaluated according to the following evaluation standard.

5: Sliding mark was not observed.
4: Light sliding mark is present, but has not been developed into chipping of the surface of the magnetic layer.
3: Surface of the magnetic layer is chipped off, but portions where the surface of the magnetic layer was peeled off or the magnetic layer was scraped are not observed.
2: A large number of positions where the surface of the magnetic layer was peeled off or the magnetic layer was scraped is observed.
1: The entire surface of the magnetic layer is scraped.

The above evaluation results are shown in Table 4

TABLE 4

| | Ferromagnetic powder | Compound used in magnetic layer | Evaluation result of durability |
| --- | --- | --- | --- |
| Example 1 | SrFe | Compound 1 | 5 |
| Example 2 | SrFe | Compound 2 | 5 |
| Example 3 | SrFe | Compound 3 | 5 |
| Example 4 | SrFe | Compound 4 | 5 |
| Example 5 | SrFe | Compound 5 | 5 |
| Example 6 | SrFe | Compound 6 | 5 |
| Example 7 | SrFe | Compound 7 | 4 |
| Example 8 | SrFe | Compound 8 | 4 |
| Comparative Example 1 | SrFe | 2,3-dihydroxynaphthalene | 2 |
| Example 9 | ε-iron oxide | Compound 1 | 5 |
| Example 10 | ε-iron oxide | Compound 2 | 5 |
| Example 11 | ε-iron oxide | Compound 3 | 5 |
| Example 12 | ε-iron oxide | Compound 4 | 5 |
| Example 13 | ε-iron oxide | Compound 5 | 5 |
| Example 14 | ε-iron oxide | Compound 6 | 5 |
| Example 15 | ε-iron oxide | Compound 7 | 4 |
| Example 16 | ε-iron oxide | Compound 8 | 4 |

TABLE 4-continued

|  | Ferromagnetic powder | Compound used in magnetic layer | Evaluation result of durability |
|---|---|---|---|
| Comparative Example 2 | ε-iron oxide | 2,3-dihydroxynaphthalene | 1 |
| Example 17 | BaFe | Compound 1 | 5 |
| Example 18 | BaFe | Compound 2 | 5 |
| Example 19 | BaFe | Compound 3 | 5 |
| Example 20 | BaFe | Compound 4 | 5 |
| Example 21 | BaFe | Compound 5 | 5 |
| Example 22 | BaFe | Compound 6 | 5 |
| Example 23 | BaFe | Compound 7 | 4 |
| Example 24 | BaFe | Compound 8 | 4 |
| Comparative Example 3 | BaFe | 2,3-dihydroxynaphthalene | 3 |

From the results of Table 4, in the magnetic tapes of Examples 1 to 24, it is possible to confirm that chipping of the surface of the magnetic layer hardly occurs in the usage in the high temperature and high humidity environment, and the durability is excellent, compared to the magnetic tapes of Comparative Examples 1 to 3. Regarding this result, the inventors have surmised that the compound added to the magnetic layer in each example contributes to an increase in coating hardness of the magnetic layer.

Evaluation of Electromagnetic Conversion Characteristics (Noise)

A magnetic signal was recorded on each magnetic tape in a tape longitudinal direction under the following conditions, and reproduced by a MR head. A reproduction signal was frequency-analyzed by a spectrum analyzer manufactured by Shibasoku Co., Ltd., and the noise integrated in a range of 0 to 600 kfci was evaluated. The unit kfci is a unit of linear recording density (cannot be converted into the unit SI).

Recording and Reproduction Conditions
Recording:
Recording track width 5 μm
Recording gap 0.17 μm
Head saturated magnetic flux density Bs 1.8 T
Reproduction:
Reproduction track width 0.4 μm
Distance between shields (sh-sh distance) 0.08 μm
Evaluation Standard
5: Substantially no noise, a signal is excellent, no error is observed.
4: A degree of noise is small and a signal is excellent.
3: Noise is observed. Signal is excellent.
2: A degree of noise is great and a signal is unclear.
1: Noise and signal cannot be distinguished or cannot be recorded.

The above evaluation results are shown in Table 5.

TABLE 5

|  | Kind of ferromagnetic powder | Average particle size of ferromagnetic powder (nm) | Evaluation result of electromagnetic conversion characteristics |
|---|---|---|---|
| Example 1 | SrFe | 15 | 4 |
| Example 2 | SrFe | 15 | 5 |
| Example 3 | SrFe | 15 | 3 |
| Example 4 | SrFe | 15 | 4 |
| Example 5 | SrFe | 15 | 4 |
| Example 6 | SrFe | 15 | 5 |
| Example 7 | SrFe | 15 | 4 |

TABLE 5-continued

|  | Kind of ferromagnetic powder | Average particle size of ferromagnetic powder (nm) | Evaluation result of electromagnetic conversion characteristics |
|---|---|---|---|
| Example 8 | SrFe | 15 | 5 |
| Comparative Example 1 | SrFe | 15 | 2 |
| Example 9 | ε-iron oxide | 13 | 4 |
| Example 10 | ε-iron oxide | 13 | 5 |
| Example 11 | ε-iron oxide | 13 | 3 |
| Example 12 | ε-iron oxide | 13 | 4 |
| Example 13 | ε-iron oxide | 13 | 4 |
| Example 14 | ε-iron oxide | 13 | 5 |
| Example 15 | ε-iron oxide | 13 | 4 |
| Example 16 | ε-iron oxide | 13 | 5 |
| Comparative Example 2 | ε-iron oxide | 13 | 1 |
| Example 17 | BaFe | 17 | 4 |
| Example 18 | BaFe | 17 | 5 |
| Example 19 | BaFe | 17 | 3 |
| Example 20 | BaFe | 17 | 4 |
| Example 21 | BaFe | 17 | 4 |
| Example 22 | BaFe | 17 | 5 |
| Example 23 | BaFe | 17 | 4 |
| Example 24 | BaFe | 17 | 5 |
| Comparative Example 3 | BaFe | 17 | 2 |

From the results shown in Table 5, in the magnetic tapes of Examples 1 to 24, it is possible to confirm that electromagnetic conversion characteristics are excellent, compared to the magnetic tapes of Comparative Examples 1 to 3. This result shows that the dispersibility of the ferromagnetic powder in the magnetic layer of the magnetic tapes of Examples 1 to 24 is excellent.

One aspect of the invention is effective in a technical field of a magnetic recording medium for high-density recording.

What is claimed is:

1. A magnetic recording medium comprising:
a non-magnetic support; and
a magnetic layer including a ferromagnetic powder and a binding agent on the non-magnetic support,
wherein the magnetic layer further includes a compound including a polyalkyleneimine chain, a vinyl polymer chain, and one or more partial structures selected from the group consisting of a partial structure represented by Formula 1 and a partial structure represented by Formula 2,

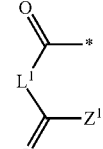

Formula 1

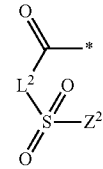

Formula 2 wherein $L^1$ in Formula 1 and $L^2$ in Formula 2 each independently represents a divalent linking group, $Z^1$ in Formula 1 and Z² in Formula 2 each independently represents a monovalent group represented by —OM or a monovalent group represented by —O⁻A⁺, M represents a hydrogen atom or an alkali metal atom, and A⁺ represents an ammonium cation.

2. The magnetic recording medium according to claim 1, wherein the compound includes 1 to 5 partial structures selected from the group consisting of the partial structure represented by Formula 1 and the partial structure represented by Formula 2 in a molecule.

3. The magnetic recording medium according to claim 1, wherein the weight-average molecular weight of the compound is 3,000 to 34,000.

4. The magnetic recording medium according to claim 1, wherein the ferromagnetic powder is a hexagonal ferrite powder.

5. The magnetic recording medium according to claim 1, wherein the ferromagnetic powder is an ε-iron oxide powder.

6. The magnetic recording medium according to claim 1, wherein the average particle size of the ferromagnetic powder is 5 to 50 nm.

7. The magnetic recording medium according to claim 1, wherein the compound includes a polyester chain.

8. The magnetic recording medium according to claim 1, wherein the magnetic layer includes 0.5 to 50.0 parts by mass of the compound with respect to 100.0 parts by mass of the ferromagnetic powder.

9. A magnetic recording and reproducing apparatus comprising:
the magnetic recording medium according to claim 1; and
a magnetic head.

10. A composition for a magnetic recording medium, comprising:
a ferromagnetic powder; and
a compound including a polyalkyleneimine chain, a vinyl polymer chain, and one or more partial structures selected from the group consisting of a partial structure represented by Formula 1 and a partial structure represented by Formula 2,

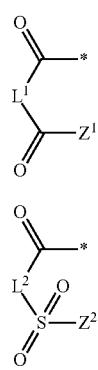

Formula 1

Formula 2 wherein $L^1$ in Formula 1 and $L^2$ in Formula 2 each independently represents a divalent linking group, $Z^1$ in Formula 1 and $Z^2$ in Formula 2 each independently represents a monovalent group represented by —OM or a monovalent group represented by —O⁻A⁺, M represents a hydrogen atom or an alkali metal atom, and A⁺ represents an ammonium cation.

11. The composition for a magnetic recording medium according to claim 10, wherein the compound includes 1 to 10 partial structures selected from the group consisting of the partial structure represented by Formula 1 and the partial structure represented by Formula 2 in a molecule.

12. The composition for a magnetic recording medium according to claim 10,
wherein the weight-average molecular weight of the compound is 3,000 to 34,000.

13. The composition for a magnetic recording medium according to claim 10,
wherein the ferromagnetic powder is a hexagonal ferrite powder.

14. The composition for a magnetic recording medium according to claim 10,
wherein the ferromagnetic powder is an ε-iron oxide powder.

15. The composition for a magnetic recording medium according to claim 10,
wherein the average particle size of the ferromagnetic powder is 5 to 50 nm.

16. The composition for a magnetic recording medium according to claim 10,
wherein the compound includes a polyester chain.

17. The composition for a magnetic recording medium according to claim 10,
wherein the magnetic layer includes 0.5 to 50.0 parts by mass of the compound with respect to 100.0 parts by mass of the ferromagnetic powder.

18. A magnetic recording medium comprising:
a non-magnetic support; and
a magnetic layer including a ferromagnetic powder and a binding agent on the non-magnetic support,
wherein the magnetic layer further includes a compound including one or more partial structures represented by Formula 2, and a polyalkyleneimine chain,

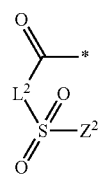

Formula 2 wherein $L^2$ in Formula 2 represents a divalent linking group, $Z^2$ represents a monovalent group represented by —OM or a monovalent group represented by —O⁻A⁺, M represents a hydrogen atom or an alkali metal atom, and A⁺ represents an ammonium cation.

19. A composition for a magnetic recording medium, comprising:
a ferromagnetic powder; and
a compound including one or more partial structures represented by Formula 2, and a polyalkyleneimine chain,

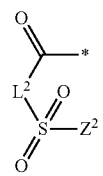

Formula 2 wherein $L^2$ in Formula 2 represents a divalent linking group, $Z^2$ represents a monovalent group represented by —OM or a monovalent group represented by —O⁻A⁺, M represents a hydrogen atom or an alkali metal atom, and A⁺ represents an ammonium cation.

\* \* \* \* \*